(12) United States Patent
Funato et al.

(10) Patent No.: US 10,647,283 B2
(45) Date of Patent: May 12, 2020

(54) SHOCK ABSORBER

(71) Applicant: KYORAKU CO., LTD., Kyoto (JP)

(72) Inventors: Takafumi Funato, Kanagawa (JP);
Teruo Tamada, Kanagawa (JP);
Yosuke Muroya, Kanagawa (JP)

(73) Assignee: KYORAKU CO., LTD., Kyoto (JP)

(*) Notice: Subject to any disclaimer, the term of this patent is extended or adjusted under 35 U.S.C. 154(b) by 25 days.

(21) Appl. No.: 15/779,166

(22) PCT Filed: Nov. 22, 2016

(86) PCT No.: PCT/JP2016/084656
§ 371 (c)(1),
(2) Date: May 25, 2018

(87) PCT Pub. No.: WO2017/090628
PCT Pub. Date: Jun. 1, 2017

(65) Prior Publication Data
US 2018/0339671 A1 Nov. 29, 2018

(30) Foreign Application Priority Data

Nov. 27, 2015 (JP) .................................. 2015-231464
Mar. 8, 2016 (JP) .................................. 2016-044927
Mar. 8, 2016 (JP) .................................. 2016-044928

(51) Int. Cl.
*F16F 7/12* (2006.01)
*B60R 21/04* (2006.01)
(Continued)

(52) U.S. Cl.
CPC .............. *B60R 21/04* (2013.01); *B60R 19/18* (2013.01); *B60R 21/34* (2013.01); *F16F 7/12* (2013.01); *B60R 2021/0414* (2013.01)

(58) Field of Classification Search
CPC .. F16F 7/12; F16F 7/121; B60R 21/04; B60R 21/34; B60R 21/0428; B60R 19/18; B60R 2021/0414; B60R 2019/188
See application file for complete search history.

(56) References Cited

U.S. PATENT DOCUMENTS 6,406,079 B2 * 6/2002 Tamada .................. B60R 19/18
293/120
7,111,713 B2 * 9/2006 Tamada .................. B60R 19/18
188/371
(Continued)

FOREIGN PATENT DOCUMENTS

JP 2004-149076 A 5/2004
JP 2006-096307 A 4/2006
(Continued)

OTHER PUBLICATIONS

International Search Report dated Dec. 27, 2016 of corresponding International Application No. PCT/JP2016/084656; 2 pgs.
(Continued)

Primary Examiner — Thomas W Irvin
(74) Attorney, Agent, or Firm — Maier & Maier, PLLC

(57) ABSTRACT

A shock absorber formed such that at least part of an end wall of a groove rib is a fragile portion, or a shock absorber that makes a fracture behavior according to a design intent. The shock absorber has a hollow molded-body having a hollow. The hollow molded-body includes front and rear walls that are spaced from and opposed to each other and a side wall that connects the front and rear walls. The side wall is provided with a front groove rib formed by recessing the front wall and a rear groove rib formed by recessing the rear wall. A side groove wall is formed by welding together at least parts of end walls of the front groove rib and the rear groove rib.

6 Claims, 16 Drawing Sheets

(51) Int. Cl.
 *B60R 19/18* (2006.01)
 *B60R 21/34* (2011.01)

(56) References Cited

U.S. PATENT DOCUMENTS

| | | | | |
|---|---|---|---|---|
| 7,143,876 B2 * | 12/2006 | Tamada | ................ | B60R 19/18 188/371 |
| 7,178,647 B2 * | 2/2007 | Tamada | ................ | B60R 19/18 188/371 |
| 7,306,080 B2 * | 12/2007 | Tamada | ................ | B60R 19/18 188/371 |
| 7,306,081 B2 * | 12/2007 | Tamada | ................ | B60R 19/18 188/371 |
| 7,370,893 B2 * | 5/2008 | Tamada | ................ | B60R 19/18 293/120 |
| 7,618,082 B2 * | 11/2009 | Tamada | ................ | B60R 19/18 296/146.6 |
| 8,016,344 B2 * | 9/2011 | Tamada | ................ | B60R 19/18 296/187.03 |
| 8,439,400 B2 * | 5/2013 | Suzuki | ............... | B60R 21/0428 280/751 |
| 8,443,950 B2 * | 5/2013 | Tamada | ................ | B60R 19/18 188/371 |
| 8,915,536 B2 * | 12/2014 | Tamada | ................ | B60R 21/04 296/187.05 |
| 9,522,646 B2 * | 12/2016 | Tamada | ................ | B60R 21/045 |
| 9,599,181 B2 * | 3/2017 | Tani | ....................... | B60J 5/0451 |
| 9,643,553 B2 * | 5/2017 | Tamada | ................ | B60R 19/18 |
| 9,682,676 B2 * | 6/2017 | Tamada | ................ | B60R 21/02 |
| 2011/0104414 A1 | 5/2011 | Onodera et al. | | |

FOREIGN PATENT DOCUMENTS

| | | |
|---|---|---|
| JP | 2006-096308 A | 4/2006 |
| JP | 2007-176451 A | 7/2007 |
| JP | 2009-023521 A | 2/2009 |
| JP | 2010-167628 A | 8/2010 |
| JP | 2011-116120 A | 6/2011 |
| JP | 2011-247384 A | 12/2011 |
| JP | 2012-076570 A | 4/2012 |

OTHER PUBLICATIONS

Japanese Office Action dated Aug. 6, 2019, in connection with counterpart JP Application No. 2016-044928 (12 pgs., including English translation).

* cited by examiner

LOAD F APPLIED

ACCORDION SHAPE DEFORMATION

THIN PORTION 105a FRACTURED

">"-SHAPE DEFORMATION

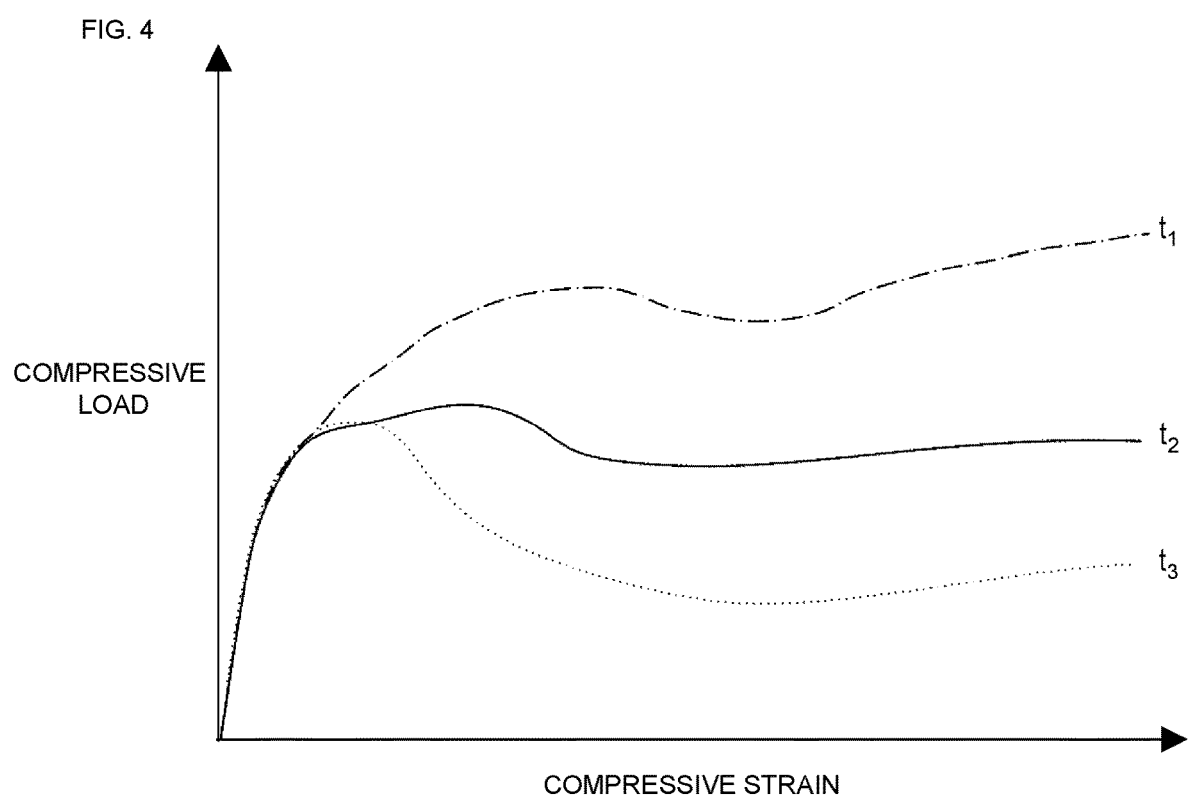

FIG. 9A
REAR VIEW
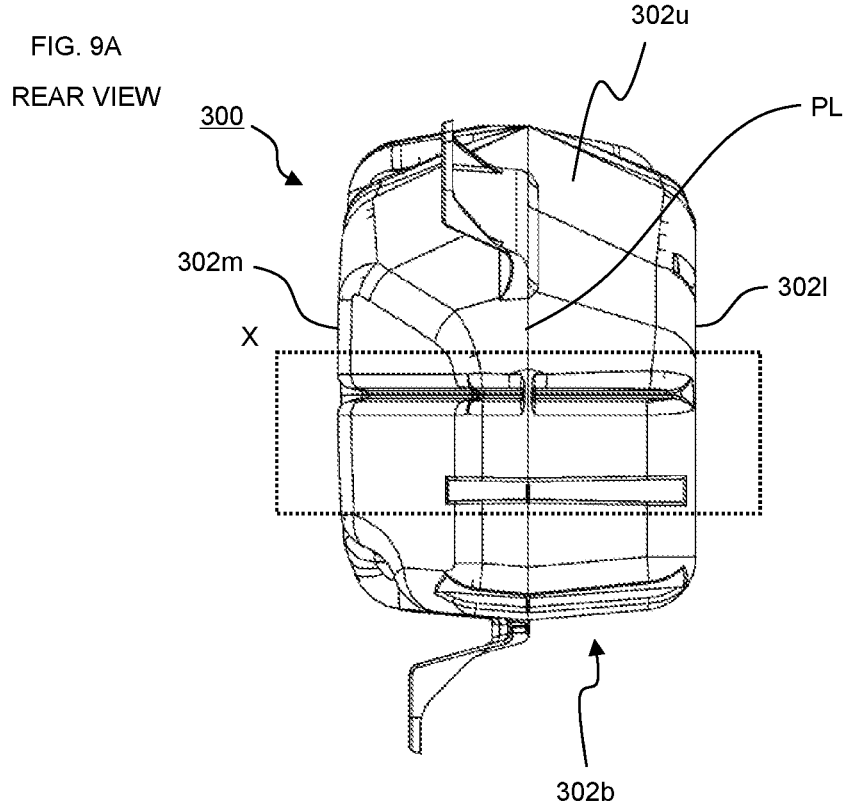
FIG. 9B  REGION X ENLARGED VIEW
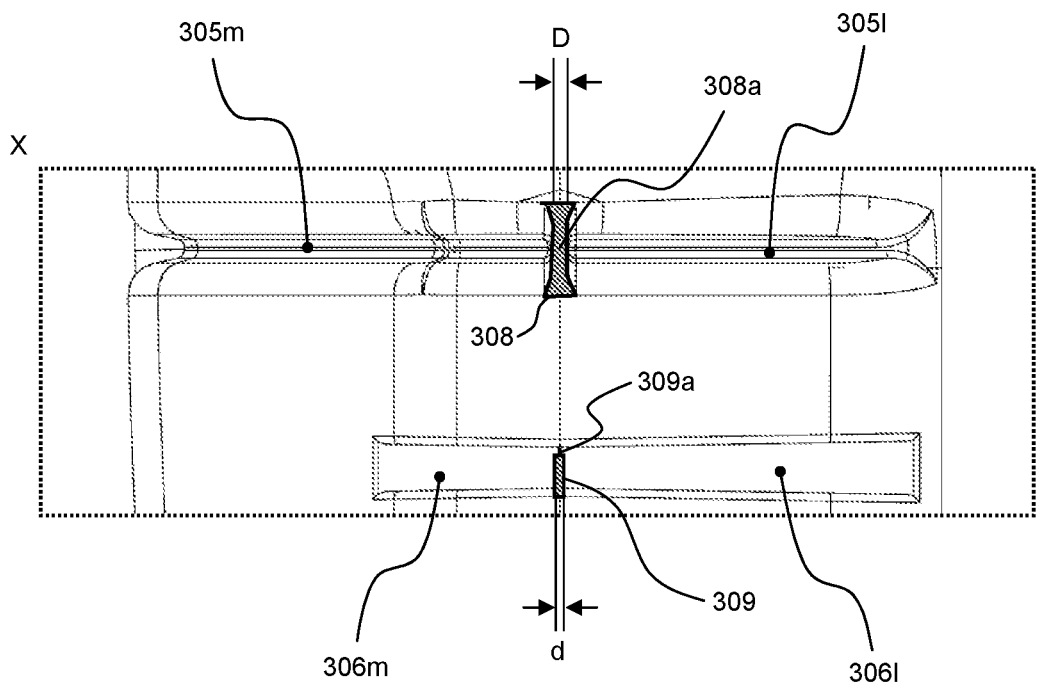

FRONT VIEW

RIGHT SIDE VIEW

REGION X ENLARGED VIEW (SLIT)

REGION X ENLARGED VIEW (NO THIN PORTION)

REGION X ENLARGED VIEW (D<d)

US 10,647,283 B2

SHOCK ABSORBER

TECHNICAL FIELD

The present invention relates to a shock absorber.

BACKGROUND ART

A shock absorber of the present invention has a function of absorbing shock to a passenger of the vehicle at the time of collision or the like by disposing in an element of the vehicle. PLT1 and the like disclose this type of shock absorbers that have a hollow, double-wall structure obtained by blow-molding a thermoplastic resin and where the ends (end walls) of recessed ribs formed from the front and rear walls are joined together to improve shock absorbency.

CITATION LIST

Patent Literature

PLT1: JP-A-2006-96308
PLT2: JP-A-2011-247384

Technical Problem

First Aspect

The present inventors investigated a compressive load applied to a shock absorber at the time of collision and found that in an embodiment shown in FIGS. 4 and 5 of PLT1, a side wall is deformed into an accordion shape rather than a ">" shape and thus the compressive load is increased as the compressive strain is increased. To cause ">"-shape deformation, a groove rib only has to be shallow. However, such a groove rib would cause a significant reduction in the shock absorption performance of the shock absorber. For this reason, it is extremely difficult to properly show the shock absorption performance while suppressing an excessive increase in the compressive load.

PLT2 discloses providing a fracture induction portion near a corner of a shock absorber in order to easily cause ">"-shape deformation. However, depending on the direction in which the shock is received or the shape of the pad, it may be necessary to receive the initial load or subsequent load using a groove rib alone. Also, it is known that a shock absorber where a side wall is first deformed into an accordion shape by an initial load and, after the peak of such deformation, is deformed into a ">" shape is preferred to a shock absorber where a side wall is deformed into a ">" shape immediately after being shocked. For this reason, it is important to control the compressive load and the deformation of the shock absorber itself. However, PLT1 or PLT2 does not disclose such control.

The present invention has been made in view of the foregoing and provides a shock absorber formed such that at least part of an end wall of a groove rib is a fragile portion.

Second Aspect

The present invention provides a shock absorber that makes a fracture behavior according to a design intent.

Third Aspect

The present invention provides a shock absorber that includes a portion having reduced stiffness against a load so that a pain received by a passenger at the time of vehicle collision or the like is alleviated.

Solution to Problem

Hereafter, problem solving means of the first to third aspects will be described. The solving means of the first to third aspects can be combined to each other. For example, there is provided a shock absorber that has at least one of the configuration of the first aspect and the configuration of the second aspect.

First Aspect

The present invention provides a shock absorber comprising a hollow molded-body having a hollow. The hollow molded-body includes front and rear walls that are spaced from and opposed to each other and a side wall that connects the front and rear walls. The side wall is provided with a front groove rib formed by recessing the front wall and a rear groove rib formed by recessing the rear wall. A side groove wall is formed by welding together at least parts of end walls of the front groove rib and the rear groove rib. At least part of the side groove wall is a fragile portion configured to be fractured when shocked.

According to the present invention, the shock absorber includes the weld by welding together the edge of the opposite-surface groove rib and the end of the load-input-surface groove rib. At least part of this weld is a fragile portion configured to be fractured when shocked. The compressive load and the deformation of the shock absorber itself can be controlled depending on the design of the fragile portion. As a result, a shock absorber that is able to properly show shock absorption performance can be provided.

The present inventors have produced a non-hollow structure (thin portion) in a side groove wall of a groove rib by providing a predetermined protrusion in split molds used for blow molding, found that the load and the deformation of the shock absorber itself can be controlled using the thickness of the thin portion, and reached the present invention.

Various embodiments of the present invention are described below. The embodiments below can be combined with each other.

Preferably, the fragile portion is a thin portion having a smaller thickness than a thickness of a non-fragile portion of the side groove wall.

Preferably, the thin portion has a shape surrounded by an arc and/or a straight line.

Preferably, a shape of the thin portion is approximately semicircular.

Preferably, a shape of the thin portion is approximately rectangular.

Preferably, the thin portion is a portion of the side groove wall, the portion being provided adjacent to the side wall.

Preferably, the thin portion is formed so as to extend from an open end of the side groove wall toward an inner portion where the side wall is present.

Preferably, a thickness of the thin portion is 0.1 to 5.0 mm.

Preferably, a value obtained by dividing a thickness of the thin portion by a thickness of the side groove wall is 0.02 to 0.80.

Preferably, the fragile portion is a slit or a notch formed so as to extend from an open end of the side groove wall toward an inner portion where the side wall is present.

Preferably, the front groove rib and the rear groove rib are semicircular ribs whose sections parallel with the front wall are approximately semicircular.

Preferably, the front groove rib and the rear groove rib are triangular ribs whose sections parallel with the front wall are approximately triangular.

Second Aspect

A shock absorber comprises a hollow molded-body having a hollow. The hollow molded-body includes front and rear walls that are spaced from and opposed to each other and a side wall that connects the front and rear walls. The side wall is provided with a front groove rib formed by recessing the front wall and a rear groove rib formed by recessing the rear wall. A side groove wall is formed by welding together at least parts of end walls of the front groove rib and the rear groove rib. The front groove rib includes first and second front groove ribs, and the rear groove rib includes first and second rear groove ribs. A first side groove wall is formed by welding together at least parts of end walls of the first front and rear groove ribs, and a second side groove wall is formed by welding together at least parts of end walls of the second front and rear groove ribs. A thickness of the thinnest portion of the second side groove wall is smaller than a thickness of the thinnest portion of the first side groove wall.

According to the present invention, the shock absorber includes the welds formed by welding together the edge of the opposite-surface groove rib and the end of the load-input-surface groove rib. At least parts of these welds are fragile portions configured to be fractured when shocked. The compressive load and the deformation of the shock absorber itself can be controlled depending on the design of the fragile portions. As a result, a shock absorber that is able to properly show shock absorption performance can be provided.

The shock absorber according to the present invention is configured such that the welds disposed in the two groove ribs have different thicknesses. Thus, when a load is inputted to the shock absorber, the thinner weld is first fractured and deformed into a "V-shape" and thus absorbs the shock. The groove rib including the thicker weld is then deformed into an "accordion shape" and thus absorbs the shock. As a result, the passenger can be protected properly. In other words, the thinner weld aims to induce fracture of the groove rib, and the thicker weld aims to improve stiffness. On the basis of this configuration, there can be provided a shock absorber that causes both "V-shape" deformation and "accordion shape" deformation and makes a fracture behavior according to a design intent. The "V-shape" deformation and "accordion shape" deformation will be described later.

Various embodiments of the present invention are described below. The embodiments below can be combined with each other.

Preferably, the first and second side groove walls are disposed on an identical plane included in the side wall.

Preferably, depths of the first front groove rib and the first rear groove rib are greater than depths of the second front groove rib and the second rear groove rib.

Preferably, a ratio of a thickness of the thinnest portion of the first side groove wall to a thickness of the thinnest portion of the second side groove wall is 1.5 or more.

Preferably, the hollow molded-body is a blow molded-body having a parting line, and the first and second side groove walls are formed on the parting line.

Preferably, a rib is formed in the front wall or the rear wall, and the first front groove rib or the first rear groove rib communicates with the rib.

Third Aspect

The present invention provides a shock absorber comprising a hollow molded-body having a hollow. The hollow molded-body has a load input surface to which a load is inputted, an opposite surface that is spaced from and opposed to the load input surface, and a connection surface that connects the load input surface and the opposite surface. A parting line is formed on the connection surface. A grooved, recessed rib is disposed so as to extend over the load input surface and the connection surface. The recessed rib is disposed such that an angle of 10 to 85° is formed between a bottom disposed along the extension direction of the recessed rib and an extension line of the load input surface at the junction of the bottom and load input surface on an end face passing through the bottom. The recessed rib is configured so as not to reach the parting line disposed on the connection surface.

The shock absorber of the present invention includes the grooved, recessed rib extending over the load input surface and connection surface. The recessed rib is disposed such that an angle of 10 to 85° is formed between the bottom disposed along the extension direction of the recessed rib and the extension line of the load input surface at the junction of the bottom and load input surface on the end face passing through the bottom. The recessed rib is also configured so as not to reach the parting line disposed on the connection surface. Due to this configuration, when a load is inputted to the load input surface, the recessed rib is deformed in a direction in which the angle of the bottom with respect to the load input surface is reduced while being deformed so as to be folded using the bottom as an axis. Thus, the stiffness of a part of the portion having the recessed rib can be reduced. As a result, the load input surface is properly deformed, allowing for protection of the passenger's body.

Various embodiments of the present invention are described below. The embodiments below can be combined with each other.

Preferably, the recessed rib is configured such that a width thereof is reduced from an edge thereof toward the bottom.

Preferably, a section of the recessed rib perpendicular to the extension direction thereof is approximately V-shaped.

Preferably, the recessed rib is configured such that a width of an edge thereof is reduced toward an end thereof in a length direction.

Preferably, the recessed rib includes multiple recessed ribs, and the recessed ribs are disposed so as to extend approximately parallel with each other.

Preferably, the recessed rib is disposed such that a ratio of a blow ratio of a portion having the recessed rib to the highest blow ratio of the hollow molded-body is 0.95 or less.

Preferably, the recessed rib is disposed such that a ratio of a distance from the parting line to a portion having the recessed rib to the greatest distance from the parting line of the hollow molded-body is 0.95 or less.

BRIEF DESCRIPTION OF DRAWINGS

FIG. 4 is a graph showing the relationship between the compressive strain and compressive load of the blow-molded body 101 when the thickness of a thin portion 105a is changed in the first embodiment of the present invention.

FIG. 9A is a rear view of the shock absorber 300 of the third embodiment of the present invention.

FIG. 9B is an enlarged view of a region X shown by a broken line in FIG. 9A.

DESCRIPTION OF EMBODIMENTS

Figure 1A:
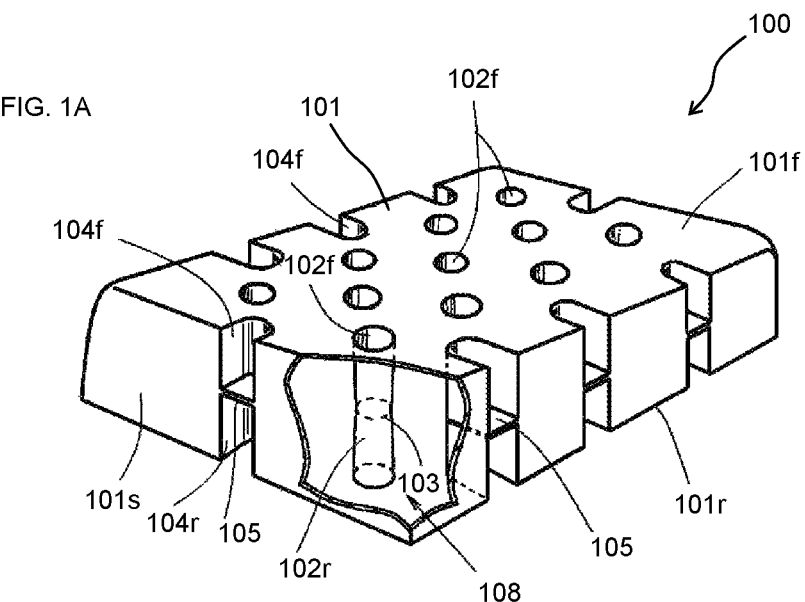
FIG. 1A is a partially cut-away perspective view showing a shock absorber 100 of a first embodiment of the present invention.

Now, embodiments of the present invention will be described. Various features described in the embodiments below can be combined with each other. Inventions are established for the respective features.

1. First Embodiment

Referring now to FIGS. 1 and 2, a shock absorber 100 of a first embodiment of the present invention will be described. The shock absorber 100 of the first embodiment relates to the first aspect of the present invention.

In the first embodiment, the shock absorber 100 is a vehicle shock absorber that absorbs shock from the inside or outside of the vehicle by disposing it in an element of the vehicle.

As shown in FIG. 1, the shock absorber 100 comprises a blow-molded body 101 having a hollow 108 (hollow molded-body). The blow-molded body 101 has a front wall 101f (an example of "load input surface") and a rear wall 101r (an example of "opposite surface") that are spaced from and opposed to each other and a side wall 101s that connects the front wall 101f and rear wall 101r (an example of "connection surface"). The thickness of the blow-molded body 101 may be any value and is, for example, 50 mm or more, preferably 50 to 200 mm. The front wall 101f has approximately cylindrical, front recessed ribs 102f formed by recessing the front wall 101f (also called circular ribs, round ribs, or the like; an example of "load-input-surface groove rib"). The rear wall 101r has approximately cylindrical, rear recessed ribs 102r formed by recessing the rear wall 101r (an example of "opposite-surface groove rib"). The ends 103 of the corresponding recessed ribs 102f, 102r are welded together.

The side wall 101s has approximately cylindrical, front groove ribs 104f formed by recessing the front wall 101f (also called semicircular ribs) and approximately cylindrical, rear groove ribs 104r formed by recessing the rear wall

Figure 2A:
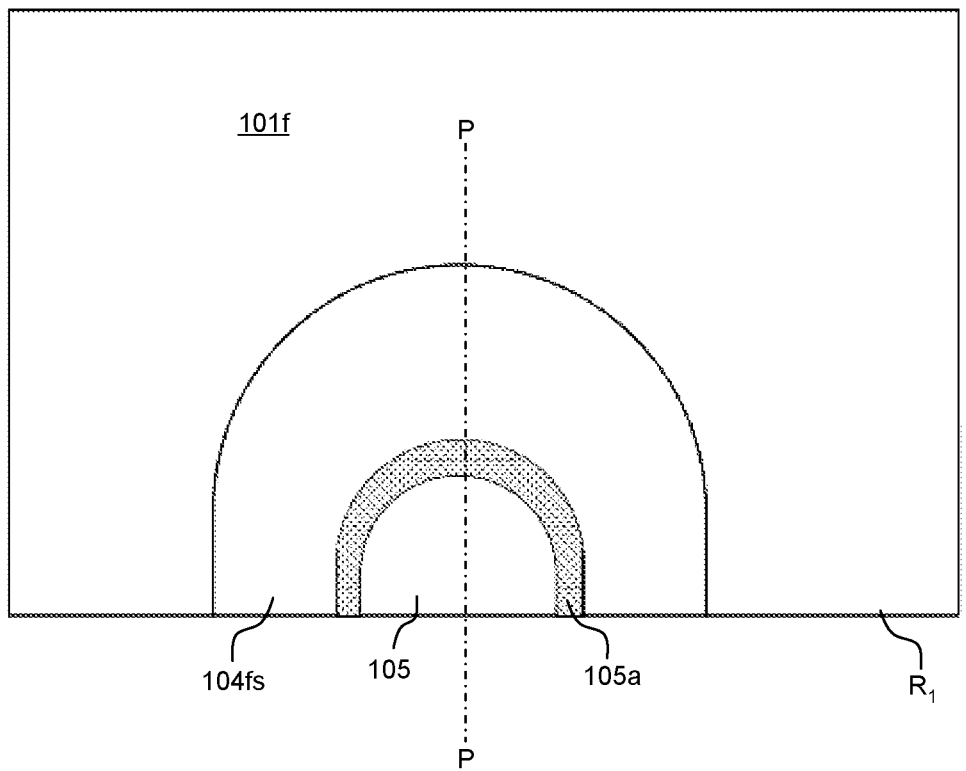
FIG. 2A is a plan view showing details of a region R1 surrounded by a dotted line in FIG. 1B.

101r. Side groove walls 105 are formed by welding together at least parts of the end walls of the corresponding front groove rib 104f and rear groove rib 104r. Specifically, the entire end walls may be welded together, or hollow non-welded portions may be formed. As shown in FIG. 2A, each side groove wall 105 is surrounded by a side wall 104fs, and one end thereof is open. That is, this end is exposed to the outside. The weld of the side groove wall 105 includes a thin portion 105a serving as a fragile portion configured to be fractured when shocked. The thin portion 105a is provided adjacent to the side wall 104fs (in short, in a part of the side groove wall 105). In other words, the thin portion 105a is disposed so as to surround the non-thin portion (non-fragile portion) of the side groove wall 105. Preferably, the thin portion 105a is formed so as to extend from the end (open end) of the side groove wall 105 exposed to the outside toward an inner portion where the side wall 104fs is present. This configuration allows the thin portion 105a to be properly fractured when shocked. The shape of the thin portion 105a may be formed by a curve, or may be formed by a straight line. For example, the thin portion 105a of the first embodiment is in the shape of an approximately semicircular ring consisting of an approximately semicircular arc and an approximately straight line. In the following description, it is assumed that the non-thin portion is a non-welded portion (hollow). However, this non-thin portion is illustrative only.

The thin portion 105a is, for example, a non-hollow structure molded using blow-molding split molds provided with a predetermined protrusion. The thickness of the thin portion 105a is preferably 0.1 to 5.0 mm, more preferably 0.3 to 2.5 mm. More specifically, this value is, for example, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, or 2.5 mm, or may be between any adjacent two of the values presented. The value of [the thickness of the thin portion 105a]/[the thickness (including that of a hollow) of the side groove wall 105 (non-thin portion)] is preferably 0.02 to 0.80, more preferably 0.10 to 0.50. Specifically, this value is, for example, 0.10, 0.15, 0.20, 0.25, 0.30, 0.35, 0.40, 0.45, or 0.50, or may be between any adjacent two of the values prevented.

Figure 1B:
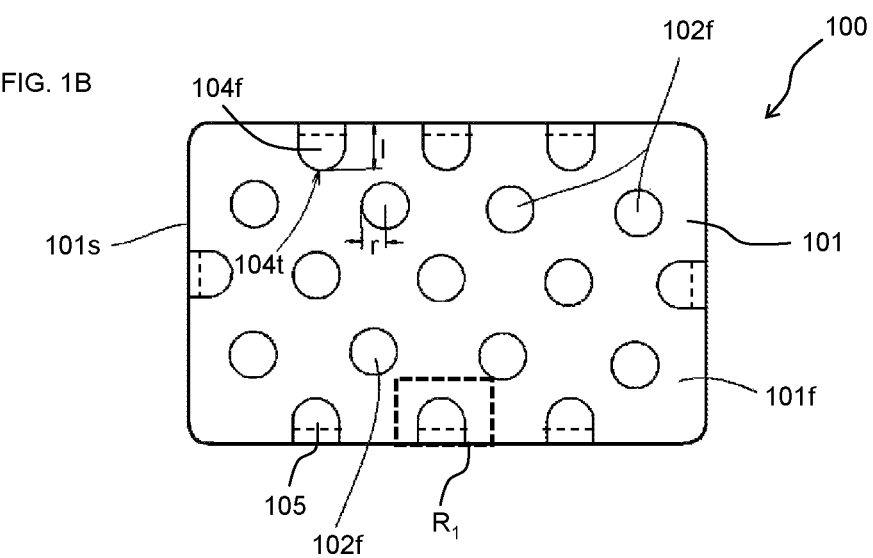
FIG. 1B is a plan view showing the shock absorber 100 of the first embodiment of the present invention.

As shown in FIG. 1B, the depth l of a front groove rib 104f is greater than the radius r of a front recessed rib 102f. Similarly, the depth of a rear groove rib 104r is greater than the radius of a rear recessed rib 102r. This configuration makes the side wall 101s of the blow-molded body 101 less likely to be deformed into a ">" shape, as described in Patent Literature 1. The value of l/r is, for example, 1.1 to 2.0. Specifically, the value is, for example, 1.1, 1.2, 1.3, 1.4, 1.5, 1.6, 1.7, 1.8, 1.9, or 2.0, or may be between any adjacent two of the values presented. Although the value of the depth l depends on the size of the blow-molded body 101, it is, for example, 15 mm or more, preferably 15 to 30 mm, more preferably 15 to 20 mm.

Referring now to FIGS. 2B and 3A to 3D, there will be described the deformation aspect of the blow-molded body 101 when a load F is applied to the front wall 101f of the blow-molded body 101.

Figure 3A:
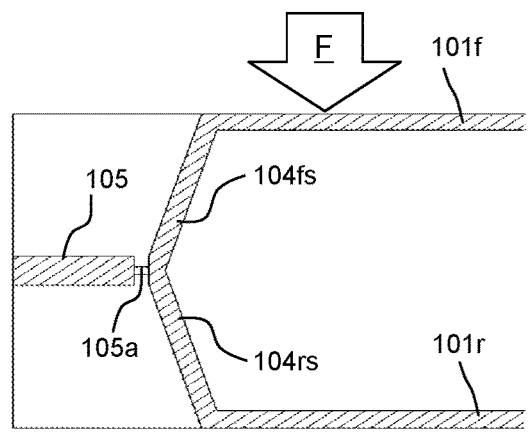
FIG. 3A is a sectional view taken along line P-P in FIGS. 2A and 2B and is a drawing showing the deformation aspect of the blow-molded body 101 forming the shock absorber 100 when a load F is applied thereto.
Figure 3B:
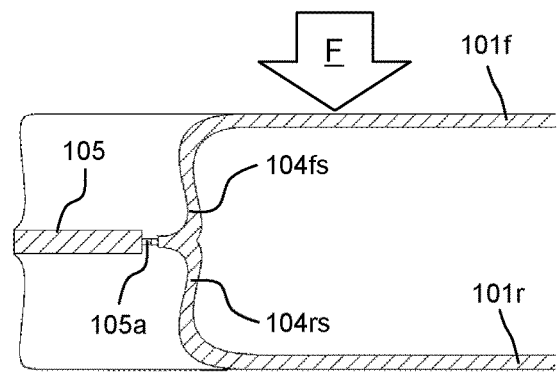
FIG. 3B is a sectional view taken along line P-P in FIGS. 2A and 2B and is a drawing showing the deformation aspect of the blow-molded body 101 forming the shock absorber 100 when a load F is applied thereto.

When the load F is applied to the front wall 101f as shown in FIG. 3A, the blow-molded body 101 is deformed such that the distance between the front wall 101f and rear wall 101r is reduced. At this time, the load F is transmitted to the side wall 101s of the blow-molded body 101 and the side walls 104fs, 104rs of the groove ribs 104f, 104r. Thus, as shown in FIG. 3B, the side walls 101s, 104fs, 104rs are deformed into accordion shapes. Actually, the load F is also transmitted to the recessed ribs 102f, 102r, which are then deformed into accordion shapes, but such deformation is not described or illustrated. Also, as shown in FIG. 3B, the approximate centers of the side walls 101s, 104fs, 104rs in the front-rear direction are slightly deformed into ">" shapes while expanding outward in the width direction. This slight ">"-shape deformation induces subsequent ">" shape deformation.

Figure 2B:
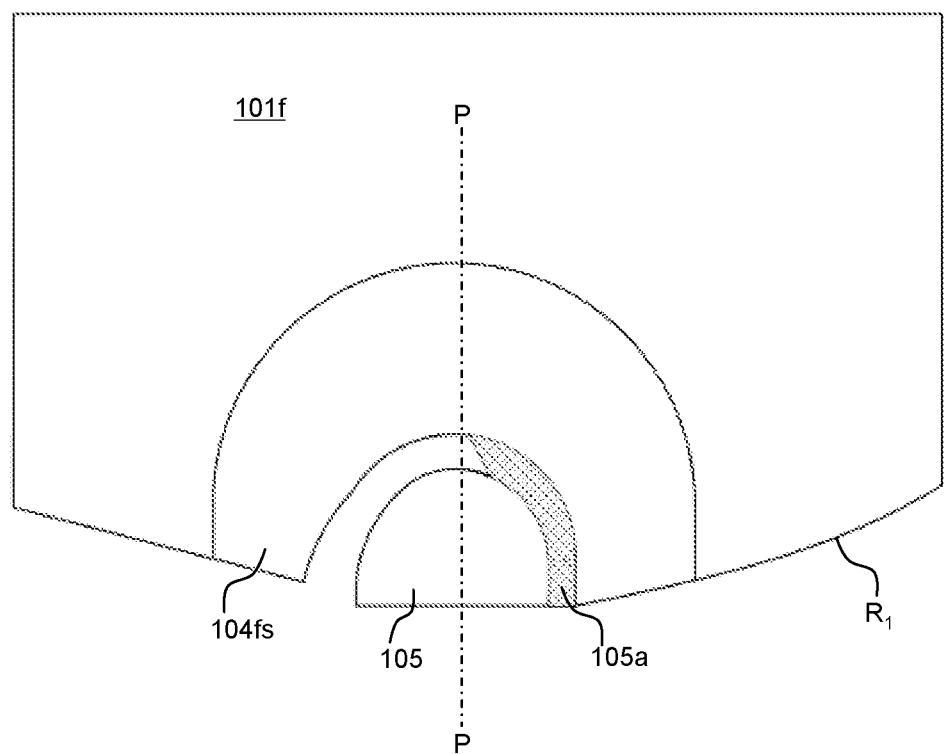
FIG. 2B is a drawing showing the deformation of a blow-molded body 101 forming the shock absorber 100 when the blow-molded body 101 is shocked in a state shown in FIG. 2A.
Figure 3C:
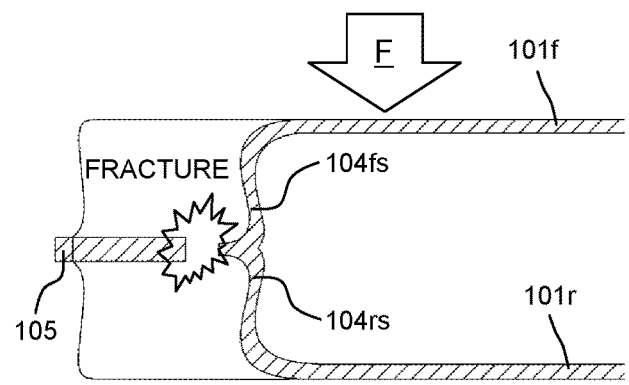
FIG. 3C is a sectional view taken along line P-P in FIGS. 2A and 2B and is a drawing showing the deformation aspect of the blow-molded body 101 forming the shock absorber 100 when a load F is applied thereto.
Figure 3D:
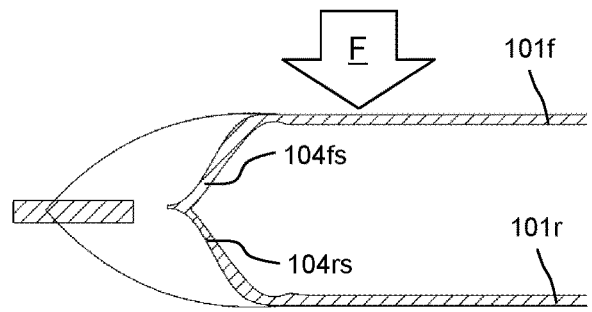
FIG. 3D is a sectional view taken along line P-P in FIGS. 2A and 2B and is a drawing showing the deformation aspect of the blow-molded body 101 forming the shock absorber 100 when a load F is applied thereto.

When the load F is further applied to the front wall 101f, the thin portion 105a can no longer endure the load and is partially fractured, causing a crack in the side groove wall 105, as shown in FIGS. 2B and 3C. In some cases, the entire thin portion 105a is fractured, resulting in the departure of the portion surrounded by the thin portion 105a, of the side groove wall 105. However, the partial fracture of the thin portion 105a is desirable. Accordingly, forming a part of the side groove wall 105 as the thin portion 105a is preferred to forming the entire side groove wall 105 as the thin portion 105a. Triggered by this fracture, the approximate centers of the side walls 101s, 104fs, 104rs in the front-rear direction expand outward in the width direction, resulting in proceeding of the ">"-shape deformation. In a shock absorber according to the related art, accordion-shape deformation alone may proceed and ">"-shape deformation may not proceed. Consequently, the compressive load may be increased quickly, failing to properly absorb the shock energy. On the other hand, in the first embodiment of the present invention, the thin portion 105a is fractured at a proper timing, resulting in proceeding of the ">"-shape deformation and proper absorption of the shock energy.

Even a shock absorber according to the related art, which does not include the thin portion 105a, may cause both accordion-shape deformation and ">"-shape deformation of the side walls 101s, 104fs, 104rs depending on the depth of the groove ribs 104f, 104r. In this case, however, the initial load is necessarily reduced, resulting in a reduction in the shock absorption performance. Also, a shock absorber according to the related art may cause only one of accordion-shape deformation and ">"-shape deformation of the side walls 101s, 104fs, 104rs depending on variations in manufacture, failing to show performance stably. On the other hand, in the present invention, the fracture of the thin portion 105a triggers ">"-shape deformation. That is, ">"-shape deformation occurs reliably. Thus, the shock absorber of the present invention stably shows high shock absorption performance. Also, by changing the thickness of the thin portion 105a as shown in FIG. 4, the compressive load applied to the blow-molded body 101 and the deformation of the blow-molded body 101 can be controlled properly. This control will be described in detail below.

The graph of FIG. 4 shows the relationship between the compressive strain and compressive load of the blow-molded body 101 in cases in which the thickness of thin portion 105a is t1, t2, or t3 where $t_1 > t_2 > t_3$.

If the thickness of the thin portion 105a is $t_1$, the timing when the thin portion 105a is fractured is relatively late. For this reason, the side walls 101s, 104fs, 104rs have already deformed into accordion shapes to some extent by the timing. If the compressive strain of the blow-molded body 101 exceeds a predetermined value (e.g., 50% of the maximum value of the compressive strain) in this deformation aspect, the compressive load would be increased, failing to properly absorb the shock energy. Accordingly, it is preferred to dispose a thinner thin portion 105a.

If the thickness of the thin portion 105a is $t_3$, the timing when the thin portion 105a is fractured is relatively early. For this reason, the side walls 101s, 104fs, 104rs are deformed into ">" shapes almost without being deformed into accordion shapes. In this deformation aspect, the initial load of the blow-molded body 101 (the peak load in the initial compression stage) is extremely low. Accordingly, it is preferred to dispose a thicker thin portion 105a.

If the thickness of the thin portion 105a is $t_2$, the thin portion 105a is fractured at a proper timing unlike in the above two cases. For this reason, when the load F is applied to the front wall 101f and thus the blow-molded body 101 is compressed, the side walls 101s, 104fs, 104rs are deformed into accordion shapes to some extent and then deformed into ">"-shapes. Such deformation can suppress an increase in the compressive load and increase the initial load, resulting in proper absorption of the shock energy.

1.1 Modification of First Embodiment

In the first embodiment, the shock absorber 100 is configured to include the recessed ribs 102f, 102r and groove ribs 104f, 104r, as shown in FIG. 1A. However, depending on the shape of the pad, the recessed ribs 102f, 102r may be difficult to form. In this case, a shock absorber 100 that does not include recessed ribs 102f, 102r but includes, as thin portions 105a, portions adjacent to side walls 104fs, of side groove walls 105 formed by groove ribs 104f, 104r may be formed as a modification of the first embodiment. In this case also, the thin portions 105a are disposed so as to surround the non-thin portions of the side groove walls 105. Also, by changing the thickness of the thin portions 105a, the compressive load applied to the blow-molded body 101 and the deformation of the blow-molded body 101 can be controlled properly.

2. Second Embodiment

Referring now to FIGS. 5A to 6B, a shock absorber 200 of a second embodiment of the present invention will be described. The shock absorber 200 of the second embodiment relates to the first aspect of the present invention.

Figure 5A:
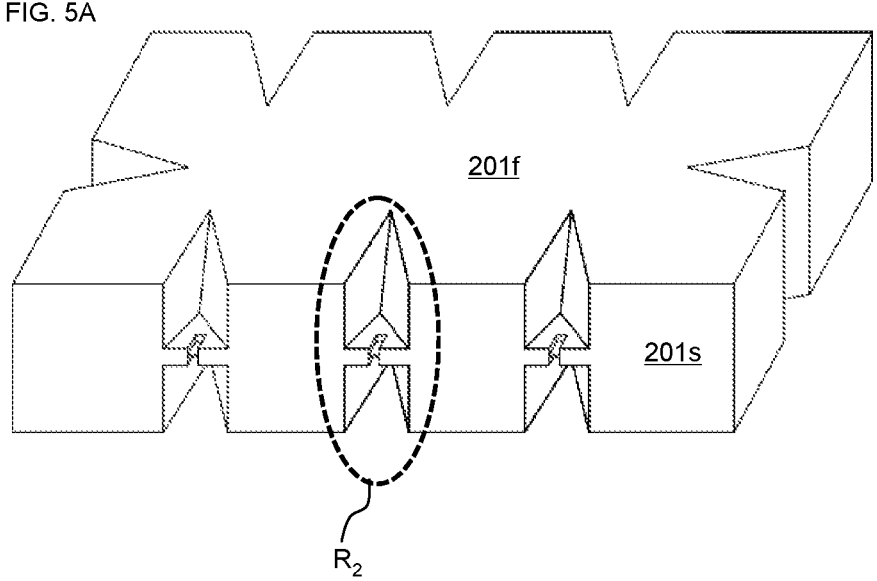
FIG. 5A is a perspective view schematically showing a shock absorber 200 of a second embodiment of the present invention.
Figure 5B:
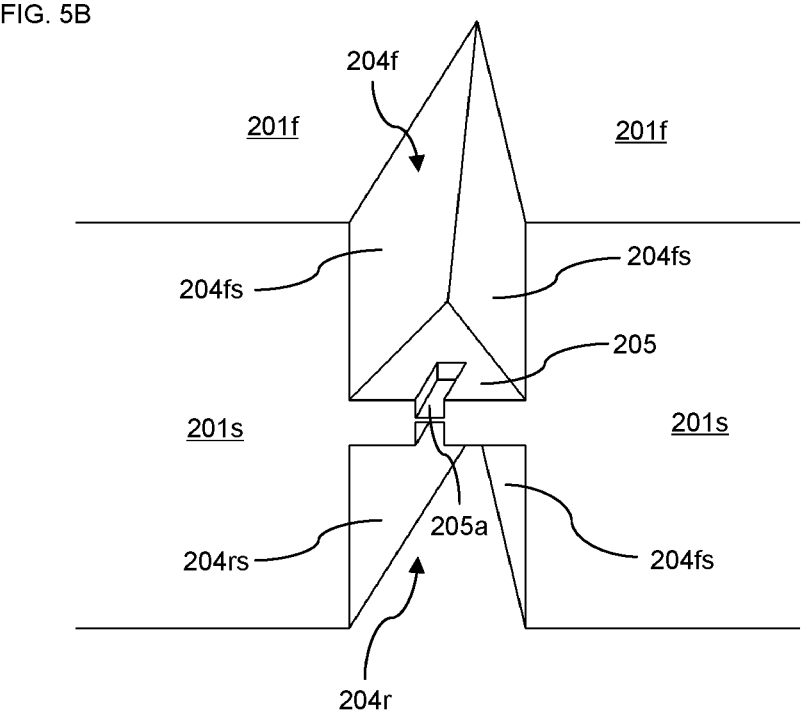
FIG. 5B is a perspective view showing details of a region R2 surrounded by a dotted line in FIG. 5A.

In the first embodiment, the shock absorber 100 is configured such that the groove ribs 104f, 104r are approximately semicircular ribs (in other words, sections parallel with the front wall 101f are approximately semicircular). In the second embodiment, on the other hand, the shock absorber 200 is configured such that groove ribs 204f, 204r are approximately triangular prism-shaped ribs (in other words, sections parallel with a front wall 201f are approximately triangular), as shown in FIGS. 5A, 5B. Although not shown in FIGS. 5A, 5B, the shock absorber 200 is formed so as to have recessed ribs. Or, as in the modification of the first embodiment, a shock absorber 200 may be formed so as not to have recessed ribs.

Figure 6A:
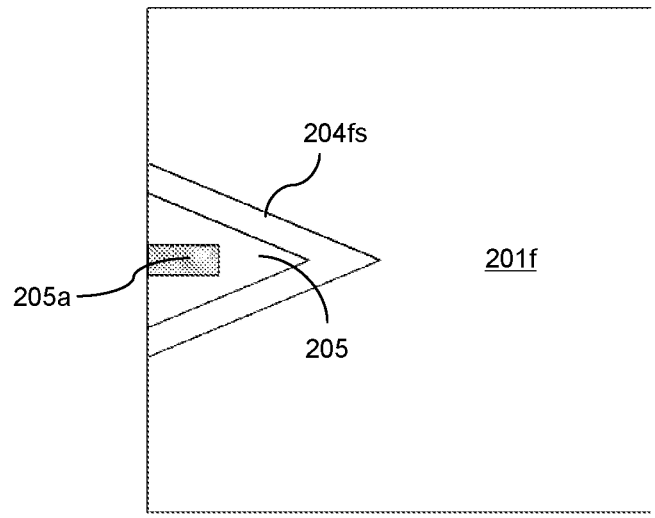
FIG. 6A is a plan view of FIG. 5B.
Figure 6B:
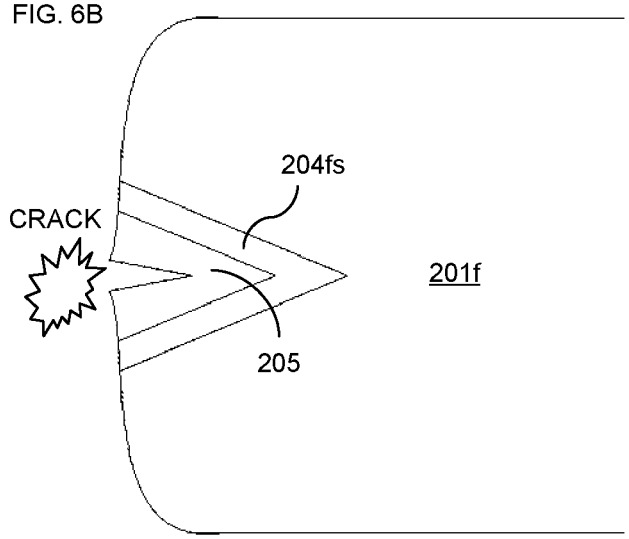
FIG. 6B is a drawing showing the deformation of a blow-molded body 200 forming the shock absorber 201 when the shock absorber 200 is shocked in a state shown in FIG. 6A.

In the second embodiment, the weld of each side groove wall 205 formed by groove ribs 204f, 204r includes a thin portion 205a serving as a fragile portion configured to be fractured when shocked, as shown in FIGS. 5A, 5B, and 6A. The thin portion 105a is provided adjacent to a side wall 201s (in short, a part of the side groove wall 205). The shape of the thin portion 205a may be formed by a curve, or may be formed by straight lines. For example, the thin portion 205a of the second embodiment is in the shape of an approximate rectangle consisting of approximate straight lines. Preferably, the thin portion 205a is formed so as to extend from the end (open end) of the side groove wall 205 exposed to the outside toward an inner portion where the side wall 204fs is present. This configuration allows the thin portion 205a to be properly fractured when shocked. When a load F is applied to the front wall 201f, the thin portion 205a can no longer endure the load and is fractured, causing a crack in the side groove wall 205, as shown in FIG. 6B. Triggered by the crack, the approximate centers of the side walls 201s, 204fs, 204rs in the front-rear direction are deformed into ">"-shapes while expanding outward in the width direction. Moreover, in the second embodiment also, by changing the thickness of the thin portion 205a, the compressive load applied to the blow-molded body 201 and the deformation of the blow-molded body 201 can be controlled properly.

2.1 Modification of Second Embodiment

In the second embodiment, as shown in FIGS. 5A to 6B, the shock absorber 200 is configured to include the thin portions 205a as fragile portions configured to be fractured when shocked. However, instead of the thin portions 205a, slits or notches may be formed in parts of the welds of the side groove walls 205 as such fragile portions. Preferably, each slit or notch is formed so as to extend from the end (open end) of the side groove wall 205 exposed to the outside toward an inner portion where the side wall 204fs are present. In this case also, when the load F is applied to the front wall 201f, the slits are opened or the notches are fractured, causing cracks. Further, by changing the length or depth of the slits or notches, the compressive load applied to the blow-molded body 201 and the deformation of the blow-molded body 201 can be controlled properly.

3. Third Embodiment

Now, a shock absorber 300 of a third embodiment of the present invention will be described. The shock absorber 300 of the third embodiment relates to the second and third aspects of the present invention.

Figure 7:
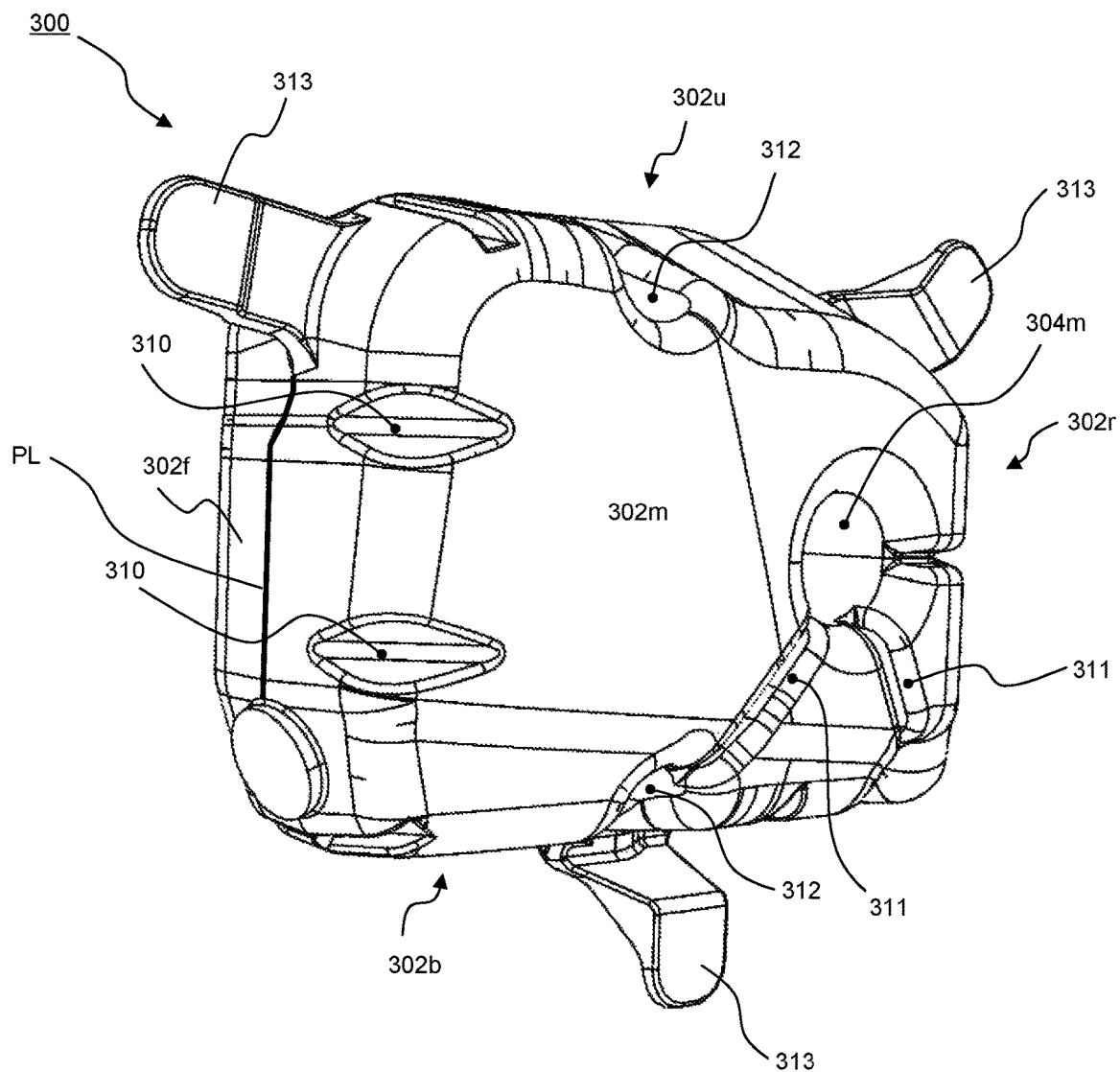
FIG. 7 is a front perspective view of a shock absorber 300 of a third embodiment of the present invention seen from the side of a right-side surface 302m.

The shock absorber 300 of the third embodiment includes a load input surface to which a load is inputted, an opposite surface that is spaced from and opposed to the load input surface, and connection surfaces that connect the load input surface and opposite surface. Specifically, as shown in FIG. 7, the shock absorber 300 has a front surface 302f and a rear surface 302r that are spaced from and opposed to each other and a right side surface 302m and a left side surface 302l that connect the front surface 302f and rear surface 302r and are opposed to each other. The right side surface 302m is a surface that is oriented toward the interior of a vehicle or the like and that a passenger collides with at the time of an accident or the like. The shock absorber 300 also has an upper surface は、302u and a bottom surface 302b that connect the front surface 302f and rear surface 302r and are opposed to each other. A parting line PL passing through the front surface 302f, upper surface 302u, rear surface 302r, and bottom surface 302b is formed. In the third embodiment, it is assumed that a passenger collides with the shock absorber 300 when a vehicle collides. The right side surface 302m corresponds to the load input surface (an example of "front wall"), and the left side surface 302l corresponds to the opposite surface (an example of "rear wall"). The front surface 302f and rear surface 302r, and the upper surface 302u and bottom surface 302b correspond to the connection surfaces (an example of "side wall"). In the third embodiment, there are provided three mounting units 313 for mounting the shock absorber 300 on a vehicle element. In the present specification, the terms "upper," "bottom," "right," "left," "front," and "rear" refer to those assuming that the side on which the right side surface 302m is present is the right side and the side on which the left side surface 302l is present is the left side.

Figure 11A:
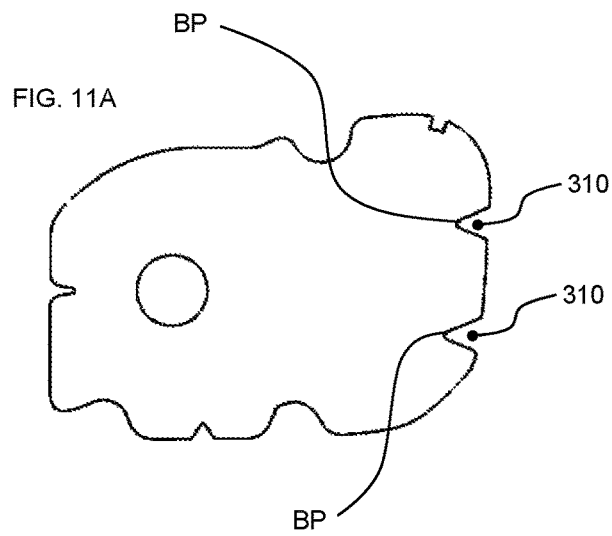
FIG. 11A is an end view of the shock absorber 300 of the third embodiment of the present invention and is a sectional end view taken along line A-A in FIG. 10A.
Figure 11B:
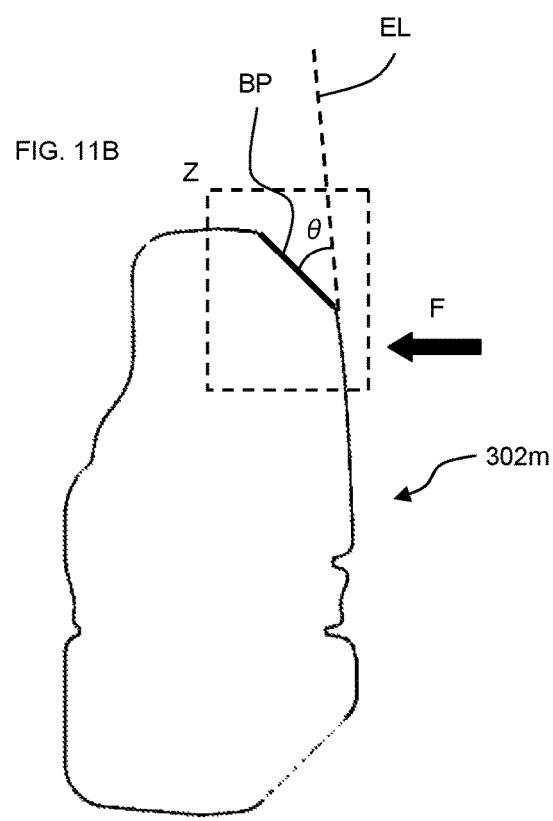
FIG. 11B is an end view of the shock absorber 300 of the third embodiment of the present invention and a sectional end view taken along line B-B in FIG. 10A.

As shown in FIG. 7, in the shock absorber 300, recessed ribs 310 are formed so as to extend over the right side surface 302m and front surface 302f. In the third embodiment, two recessed ribs 310 are formed so as to extend approximately parallel with each other. The recessed ribs 310 are one form of groove ribs. As shown in FIGS. 7, 11A, and 11B, each recessed rib 310 is disposed such that an angle of 10 to 85° is formed between a bottom BP disposed along the extension direction of the recessed rib 310 and an extension line EL of the load input surface (right side surface 302m) at the junction of the bottom BP and load input surface (right side surface 302m). The recessed ribs 310 are configured so as not to reach a parting line PL formed on the front surface 302f of the shock absorber 300.

Figure 8A:
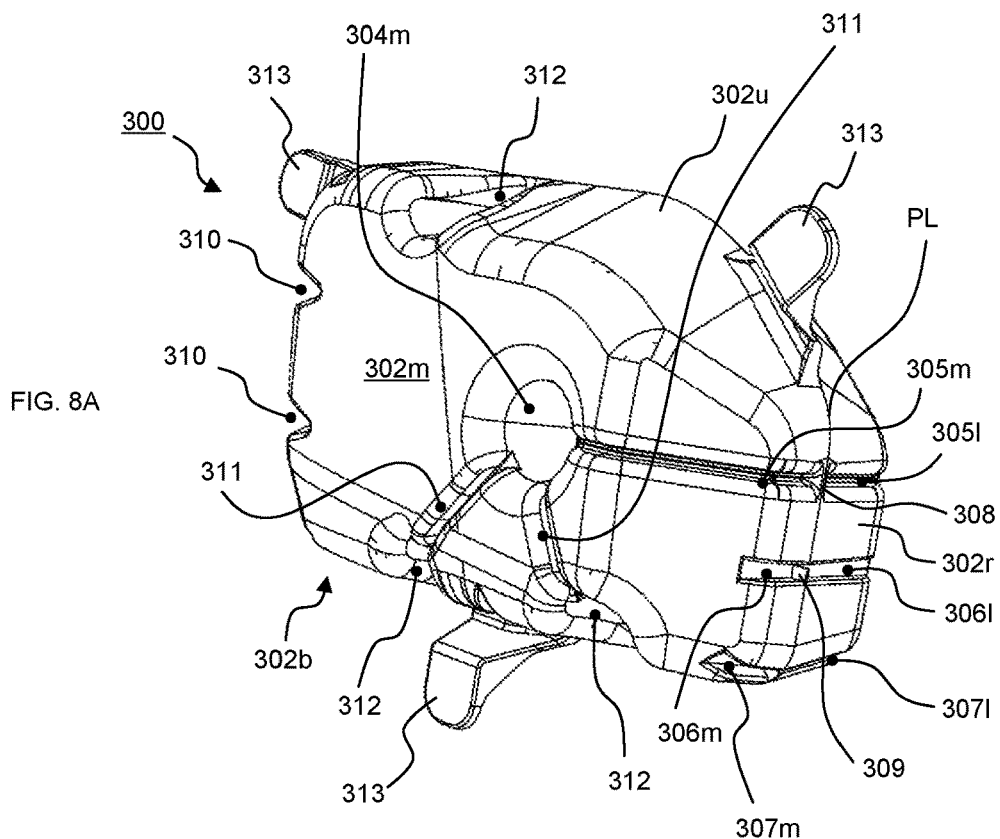
FIG. 8A is a rear perspective view of the shock absorber 300 of the third embodiment of the present invention seen from the side of the right-side surface 302m.
Figure 8B:
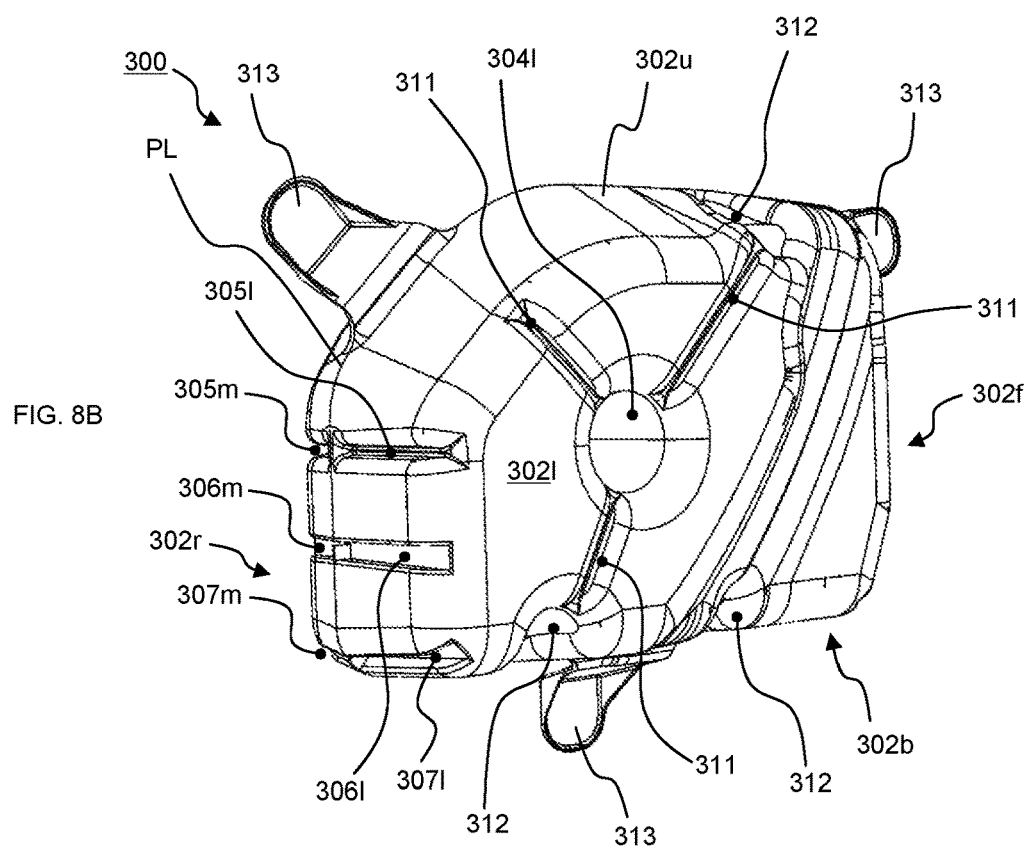
FIG. 8B is a rear perspective view of the shock absorber 300 of the third embodiment of the present invention seen from the side of a left side surface 302l.

As shown in FIGS. 8A and 8B, in the shock absorber 300, the rear surface 302r has a first right groove rib 305m and a first left groove rib 305l, a second right groove rib 306m and a second left groove rib 306l, and a third right groove rib 307m and a third left groove rib 307l. Of these groove ribs, those having a letter m at the end of the reference sign are groove ribs formed by recessing the right side surface 302m toward the left side surface 302l, and those having a letter l at the end of the reference sign are groove ribs formed by recessing the left side surface 302l toward the right side surface 302m. The same applies to m and l at the ends of the reference signs of the other groove ribs. Also, the first right groove rib 305m and first left groove rib 305l will be collectively referred to as a first groove rib 305; the second right groove rib 306m and second left groove rib 306l as a second groove rib 306; and the third right groove rib 307m and third left groove rib 307l as a third groove rib 307. As shown in FIG. 9B, a first weld 308 (an example of a "first side groove wall") is formed by welding together at least parts of ends of the first right groove rib 305m and first left groove rib 305l. Also, a second weld 309 (an example of a "second side groove wall") is formed by welding together at least parts of ends of the second right groove rib 306m and second left groove rib 306l. In the third embodiment, the first weld 308 and second weld 309 are disposed on the same plane (rear surface 302r) included in the connection surface. As shown in FIGS. 8A to 9B, the first weld 308 and second weld 309 are formed on the parting line PL. The first left groove rib 305l and second left groove rib 306l in the third embodiment correspond to "first and second opposite surface groove ribs" formed by recessing the opposite surface toward the load input surface. The first right groove rib 305m and second right groove rib 306m correspond to "first and second load input surface groove ribs" formed by recessing the load input surface toward the opposite surface.

Also, as shown in FIGS. 7, 8A, and 8B, in the shock absorber 300, the right side surface 302m has one right round rib 304m and two diagonal groove ribs 311. On the other hand, the left side surface 302l has one left round rib 304l and three diagonal groove ribs 311. The upper surface 302u has one crescentic rib 312, and the bottom surface 302b has two crescentic ribs 312. In the third embodiment, the first right groove rib 305m communicates with the right round rib 304m formed in the right side surface 302m. These ribs may be formed in any formation areas, shapes, sizes, orientations, and numbers and are formed properly in accordance with desired characteristics.

First Weld 308 and Second Weld 309

Referring now to FIGS. 9A and 9B, the first weld 308 and second weld 309 will be described. FIG. 9A is a rear view of the shock absorber 300 of the third embodiment of the present invention, and FIG. 9B is an enlarged view of a region X shown by a broken line in FIG. 9A.

As shown in FIG. 9B, the first weld 308 is formed by welding together at least parts of the ends of the first right groove rib 305m and first left groove rib 305l, and the second weld 309 is formed by welding together at least parts of the ends of the second right groove rib 306m and second left groove rib 306l. The thickness of the first weld 308 is minimized in the central portion 308a of the ribs 305m, 305l in the width direction, and portions of the first weld 308 more distant from the center have greater thicknesses. On the other hand, the second weld 309 has an approximately constant thickness in the entire width direction of the second right groove rib 306m, 306l. The second weld 309 is provided with a thin portion 309a that extends in the depth direction of the second right groove ribs 306m, 306l. Accordingly, in the third embodiment, the central portion 308a of the ribs 305m, 305l in the width direction is the thinnest portion of the first weld 308, and the thin portion 309a is the thinnest portion of the second weld 309. The thickness d1 (not shown) of the thinnest portion (thin portion 309a) of the second weld 309 is smaller than the thickness D of the thinnest portion (central portion 308a) of the first weld 308. The thickness d of the portion other than the thin portion 309a of the second weld 309 is also smaller than the thickness D of the thinnest portion (central portion 308a) of the first weld 308. When the load F is inputted to the load input surface (right side surface 302m), the thin portion 309a is fractured, inducing "V-shape" deformation of the shock absorber 300.

The value of the ratio of the thickness D to the thickness d is, for example, 1.5 or more, preferably 1.7 or more, more preferably 2 or more. Specifically, the value of the ratio is 1.5, 1.55, 1.6, 1.65, 1.7, 1.75, 1.8, 1.85, 1.9, 1.95, 2, 2.1, 2.2, 2.3, 2.4, 2.5, 2.6, 2.7, 2.8, 2.9, 3, 3.5, 4, 4.5, 5, 6, 7, 8, 9, or 10, or may be between any adjacent two of the values presented, or may be a value greater than 10.

The thickness D is, for example, 1 to 10 mm, preferably 1.5 to 8 mm, more preferably 2 to 5 mm. Specifically, the thickness D is 1.5, 1.55, 1.6, 1.65, 1.7, 1.75, 1.8, 1.85, 1.9, 1.95, 2, 2.05, 2.1, 2.15, 2.2, 2.25, 2.3, 2.35, 2.4, 2.45, 2.5, 2.55, 2.6, 2.65, 2.7, 2.75, 2.8, 2.85, 2.9, 2.95, 3, 3.5, 4, 4.5, 5, 6, 7, 8, 9, or 10 mm, may be between any adjacent two of the values presented, or may be a value greater than 10.

The thickness d is, for example, 0.1 to 6 mm, preferably 0.3 to 5 mm, more preferably 0.5 to 3 mm. Specifically, the thickness d is 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.5, 2, 2.5, 3, 3.5, 4, 4.5, 5, 5.5, or 6 mm, may be between any adjacent two of the values presented, or may be a value greater than 6. The thickness d1 of the thin portion 309a is, for example, 0.01 to 3 mm, preferably, 0.03 to 2 mm, more preferably 0.05 to 1 mm. Specifically, the thickness d1 is 0.01, 0.015, 0.02, 0.025, 0.03, 0.035, 0.04, 0.045, 0.05, 0.055, 0.06, 0.065, 0.07, 0.075, 0.08, 0.085, 0.09, 0.1, 0.15, 0.2, 0.25, 0.3, 0.35, 0.4, 0.45, 0.5, 0.55, 0.6, 0.7, 0.8, 0.85, 0.9, 0.95, 1, 1.5, 2, 2.5, or 3 mm, may be between any adjacent two of the values presented, or may be a value greater than 3.

The width and depth of the second right groove rib 306m in plan view are each, for example, 1 to 20 mm, preferably 1.5 to 15 mm, more preferably 2 to 10 mm. Specifically, the width and depth are each 1.5, 1.6, 1.7, 1.8, 1.9, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, or 20 mm, may each be between any adjacent two of the values presented, or may each be a value greater than 20.

In the third embodiment, the depth (the depth toward the inside of the hollow molded-body) of the first groove rib 305 is greater than the depth of the second groove rib 306. The value of the ratio of the depth of the first groove rib 305 to the depth of the second groove rib 306 is, for example, 1.01 or more, preferably 1.03 or more, more preferably 1.05 or more. Specifically, the value of the ratio is 1.01, 1.02, 1.03, 1.04, 1.05, 1.06, 1.07, 1.08, 1.09, 1.1, 1.2, 1.3, 1.4, 1.5, 1.6, 1.7, 1.8, 1.9, or 2, or may be between any adjacent two of the values presented, or may be a value greater than 2. The above configuration allows for an improvement in the stiffness of the first groove rib 305 and thus allows for proper absorption of the shock.

As shown in FIGS. 8A and 8B, the first right groove rib 305$m$ communicates with the right round rib 304$m$ formed in the right side surface 302$m$. This configuration allows for a further improvement in the stiffness of the first right groove rib 305$m$. Instead of the first right groove rib 305$m$, the first left groove rib 305$l$ may be configured to communicate with the left round rib 304$l$ formed in the left side surface 302$l$. Or, the first right groove rib 305$m$ and the first left groove rib 305$l$ may be configured to communicate with the right round rib 304$m$ and left round rib 304$l$, respectively.

Due to the above configuration, when the load F is applied to the right side surface 302$m$ serving as a load input surface, the second weld 309 (and thin portion 309$a$) of the second groove rib 306 is fractured and deformed into a "V-shape" earlier than the first groove rib 305, allowing for absorption of the shock. Also, even after the second weld 309 (and thin portion 309$a$) is fractured, the first groove rib 305 is deformed into an "accordion shape" until the first weld 308 of the first groove rib 305 is fractured, allowing for proper absorption of the load F. The "accordion shape" deformation and "V-shape" deformation will be described below.

Figure 12A:
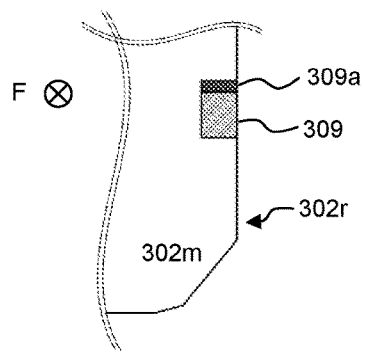
FIG. 12A is a conceptual drawing showing "accordion shape" deformation and "V-shape" deformation and is a schematic drawing showing a pre-deformation state.
Figure 12B:
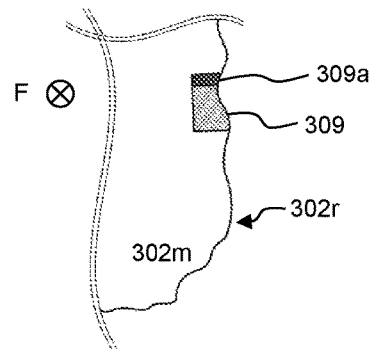
FIG. 12B is a conceptual drawing showing "accordion shape" deformation and "V-shape" deformation and is a schematic drawing showing "accordion shape" deformation.
Figure 12C:
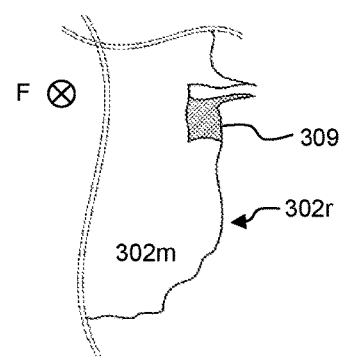
FIG. 12C is a conceptual drawing showing "accordion shape" deformation and "V-shape" deformation and is a schematic drawing showing a region Y in FIG. 10B during "V-shape" deformation.
Figure 12D:
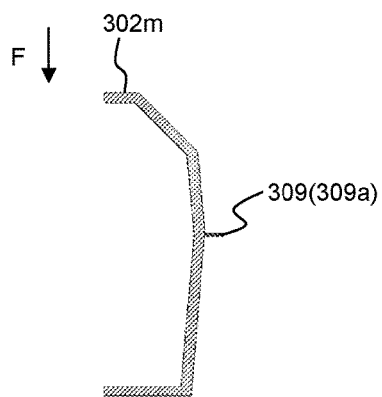
FIG. 12D is a conceptual drawing showing "accordion shape" deformation and "V-shape" deformation and is a schematic drawing showing a pre-deformation state.
Figure 12E:
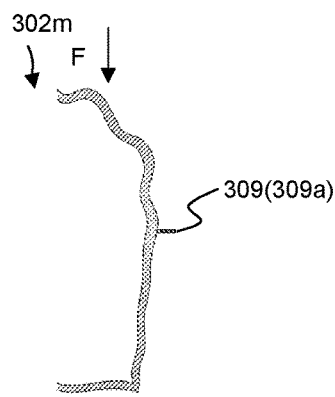
FIG. 12E is a conceptual drawing showing "accordion shape" deformation and "V-shape" deformation and is a schematic drawing showing "accordion shape" deformation.
Figure 12F:
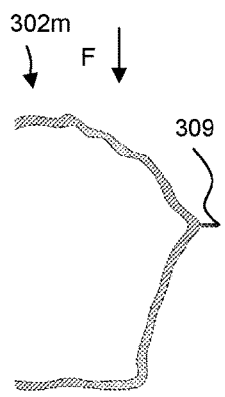
FIG. 12F is a conceptual drawing showing "accordion shape" deformation and "V-shape" deformation and is a schematic line sectional end view in the vertical direction of the drawing passing through a second weld 309 in the region Y in FIG. 10B during "V-shape" deformation.

FIGS. 12A to 12F are conceptual drawings showing the "accordion shape" deformation and "V-shape" deformation. FIGS. 12A to 12C are schematic drawings of a region Y in FIG. 10B, and the load F is inputted from the front to the rear of the drawings. FIGS. 12D to 12F are schematic sectional end views of in the vertical direction of the drawing passing through the second weld 309 in the region Y in FIG. 10B, and the load F is inputted in the downward direction of the drawings.

Figure 16:
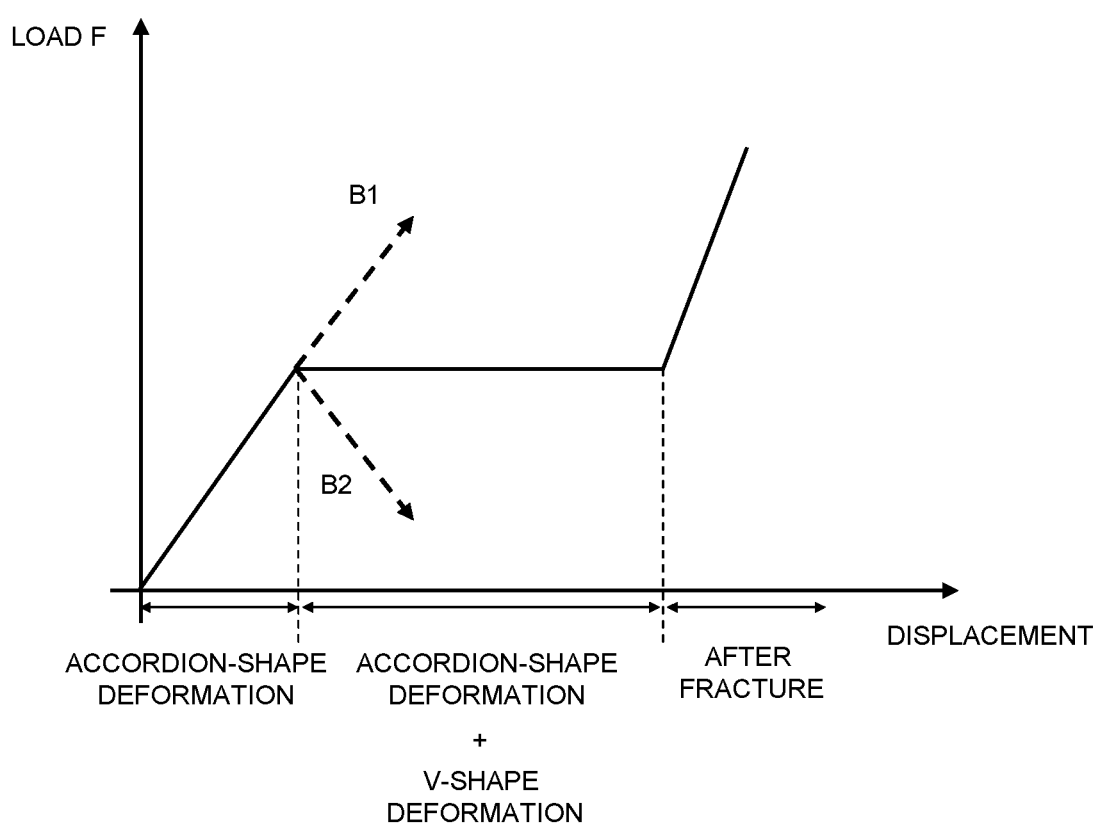
FIG. 16 is a conceptual diagram showing the coexistence of "accordion shape" deformation and "V-shape" deformation.

When the load F is inputted to the right side surface 302$m$ as shown in FIGS. 12A and 12D, the shock absorber 300 is deformed into an "accordion shape" and absorbs the load F as shown in FIGS. 12B and 12E. When the load F is further inputted and the thin portion 309$a$ forming a part of the second weld 309 is fractured, the thin portion 309$a$ and the vicinity thereof are deformed into a "V-shape" and the remaining portion of the second weld 309 is deformed into an "accordion shape" as shown in FIG. 12F. In other words, there coexist the "V-shape" deformation of the thin portion 309$a$ due to the fracture thereof and the "accordion shape" deformation of the remaining portion of the second weld 309, allowing for proper absorption of the load F. While the coexistence of the "V-shape" deformation and "accordion shape" deformation in the second weld 309 have been described for the sake of convenience, deformation also occurs in other areas. When the second weld 309 of the second groove rib 306 is fractured, the second weld 309 and the vicinity thereof are deformed into a "V-shape," and the first weld 308 of the first groove rib 305 and the vicinity thereof are deformed into an "accordion shape" until the first weld 308 is fractured. This state is schematically shown in FIG. 16. In FIG. 16, a vector B1 represents the relationship between the "displacement" and "load F" when the "accordion shape" deformation alone continues, and a vector B2 represents the relationship between the "displacement" and "load F" when the "V-shape" deformation alone continues. In the third embodiment, there coexist the "V-shape" deformation of the second weld 309 and the "accordion shape" deformation of the first weld 308. Thus, the load F is applied in an approximately constant amount in a direction obtained by combining the vectors B1 and B2. When the first weld 308 and second weld 309 are fractured, the load F is increased. Note that the load F is absorbed at a higher absorption rate by the "V-shape" deformation than by the "accordion shape" deformation.

As described above, when the load F is inputted to the load input surface (right side surface 302$m$), the second groove rib 306 is deformed into an "accordion shape" until the second weld 309 (and thin portion 309$a$) is fractured; and after the second weld 309 (and thin portion 309$a$) is fractured, the second groove rib 306 is deformed into a "V-shape." Thus, the load F can be absorbed properly. Also, even after the second weld 309 (and thin portion 309$a$) of the second groove rib 306 is fractured, the first groove rib 305 is deformed into an "accordion shape" until the first weld 308 is fractured. Thus, the load F can be absorbed more properly.

As described above, the second groove rib 306 including the second weld 309 for inducing fracture and the first groove rib 305 including the first weld 308 for improving stiffness are disposed adjacent to each other. Thus, the shock absorber 300 that makes a fracture behavior according to the design intent can be provided. That is, the shock absorber 300 of the third embodiment is able to absorb the load F by causing "V-shape" deformation of the second weld 309 and "accordion shape" deformation of the first weld 308 in combination. Note that the shape and size of the shock absorber 300 described in the third embodiment are illustrative only, and the present invention is not limited thereto. For example, the second weld 309 may be formed so as to be thicker than the first weld 308. Or, the second weld 309 may be formed in the second groove rib 306, and thinner welds than the second weld 309 may be formed in the first groove rib 305 and third groove rib 307.

Recessed Rib 310

Figure 10A:
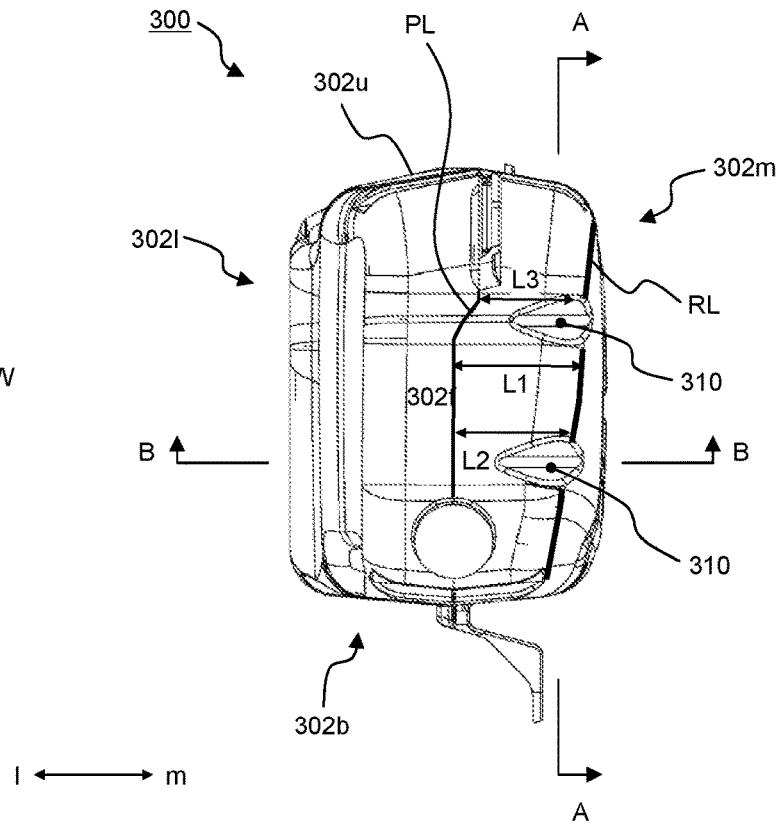
FIG. 10A is a front view of the shock absorber 300 of the third embodiment of the present invention.
Figure 10B:
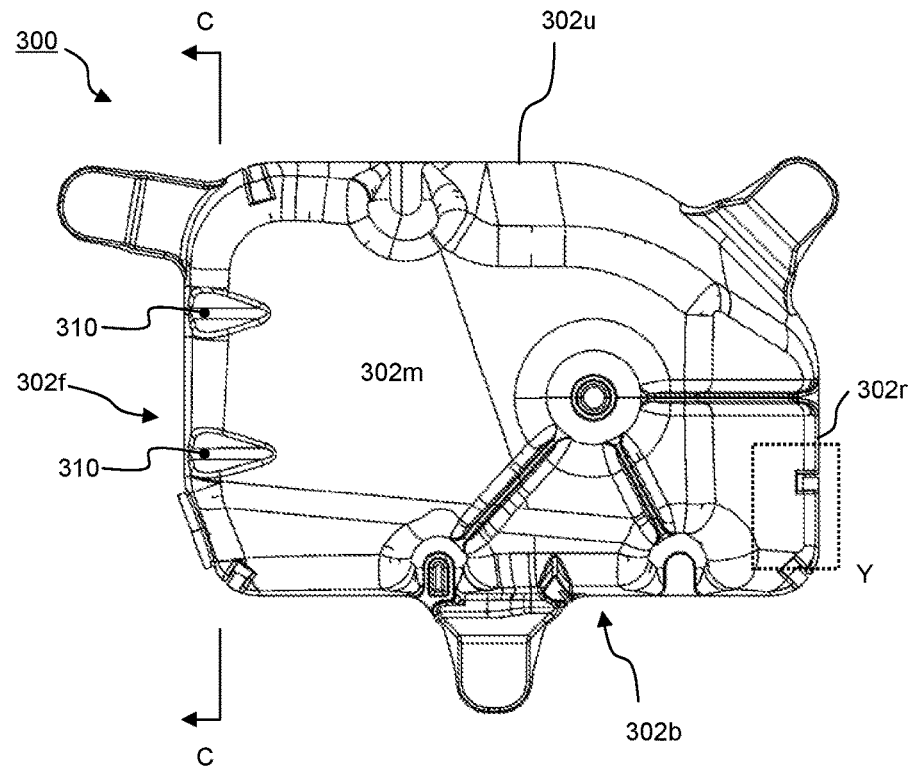
FIG. 10B is a right side view of the shock absorber 300 of the third embodiment of the present invention.

Referring now to FIGS. 10A to 11C, the recessed ribs 310 will be described. In the third embodiment, as shown in FIG. 10A, the two recessed ribs 310 are disposed so as to extend over the front surface 302$f$ and right side surface 302$m$ approximately in parallel with each other. The recessed ribs 310 have a function of reducing stiffness against the load F. This is because if the right side surface 302$m$ serving as a load input surface has excessive stiffness, a greater load would be applied to the passenger's body when the passenger's body collides with the right side surface 302$m$. The passenger's body is protected by deforming the right side surface 302$m$ properly.

Figure 11C:
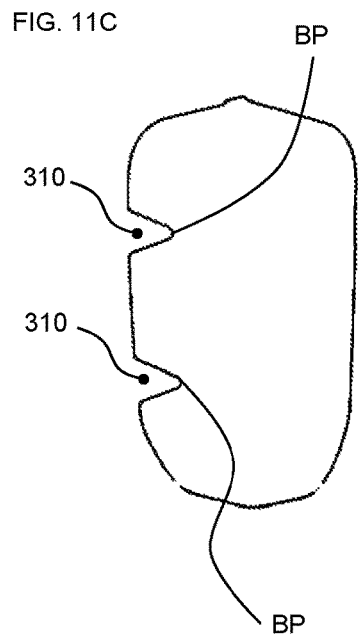
FIG. 11C is an end view of the shock absorber 300 of the third embodiment of the present invention and a sectional end view taken along line C-C in FIG. 10B.

As shown in FIGS. 10A to 11C, the recessed ribs 310 are disposed such that an angle of 10 to 85° is formed between the bottom BP disposed along the extension direction of the recessed ribs 310 and the extension line EL of the load input surface (right side surface 302$m$) at the junction of the bottom BP and load input surface (right side surface 302$m$) on an end face passing through the bottom BP. FIG. 11A is a sectional end view taken along line A-A in FIG. 10A; FIG. 11B is a sectional end view taken along B-B in FIG. 10A; and FIG. 11C is a sectional end view taken along line C-C in FIG. 10B. The line B-B sectional end view of FIG. 10A corresponds to the end face passing through the bottom BP disposed along the extension direction of the recessed ribs 310. The angle $\theta$ between the extension line EL and bottom BP is, for example, 10 to 80°, preferably 20 to 70°, more preferably 30 to 60°. Specifically, the angle $\theta$ is 10, 15, 20, 25, 30, 35, 40, 45, 50, 55, 60, 65, 70, 75, or 80°, or may be between any adjacent two of the values presented. In the third embodiment, the angle θ is 45°.

The recessed ribs 310 are configured so as not to reach the parting line PL formed on the front surface 302f of the shock absorber 300. The reason is that if the recessed ribs 310 reach the parting line PL having high stiffness, deformation of the recessed ribs 310 (to be discussed later) becomes difficult, failing to reduce the stiffness of the right side surface 302m.

Figure 13A:
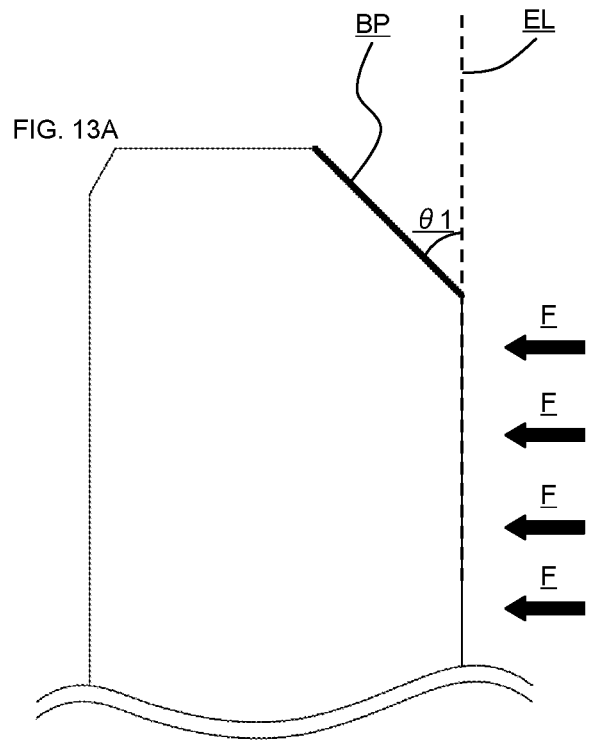
FIG. 13A is an enlarged schematic view of a region Z in FIG. 11B showing an aspect in which the angle θ of a bottom BP with respect to the load input surface is changed when the load F is inputted and is a drawing showing an aspect before the load F is inputted.
Figure 13B:
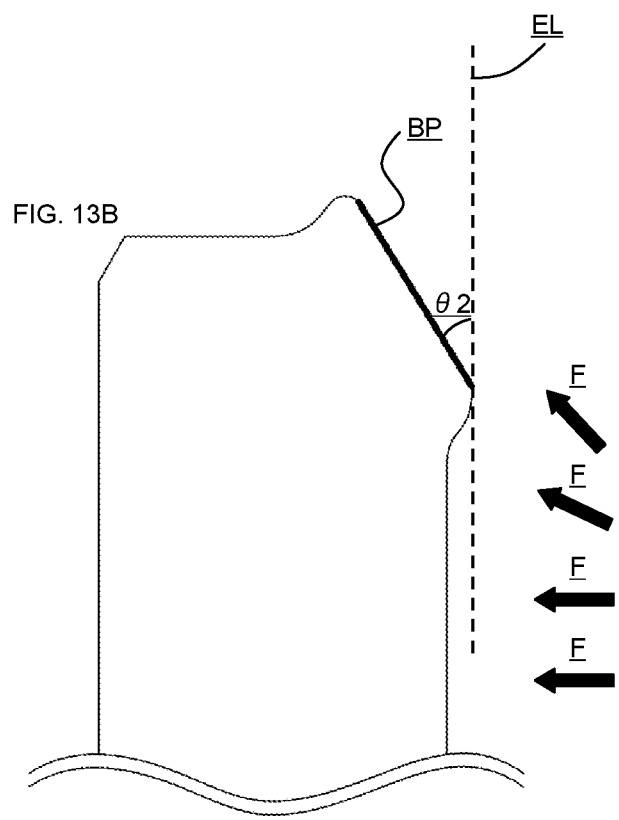
FIG. 13B is an enlarged schematic view of the region Z in FIG. 11B showing an aspect in which the angle θ of the bottom BP with respect to the load input surface is changed when the load F is inputted and is a drawing showing an aspect during input of the load F.

As shown in FIGS. 10A, 10B, 11A, and 11C, the recessed ribs 310 are configured such that the widths thereof are reduced from the edges toward the bottoms BP. The recessed ribs 310 are also configured such that the widths of the edges thereof are reduced toward the ends thereof in the length direction. Sections of the recessed ribs 310 perpendicular to the extension direction thereof are approximately V-shaped. As shown in FIG. 11A, the recessed ribs 310 have approximately V-shaped sections in the line A-A sectional end view. Also, as shown in FIG. 11C, the recessed ribs 310 have approximately V-shaped sections in the line C-C sectional end view. The two recessed ribs 310 are disposed so as to extend in parallel with each other. Due to this configuration, when the load F is inputted to the load input surface (right side surface 302m) as shown in FIGS. 13A and 13B, the recessed ribs 310 can be deformed in a direction in which the angle θ of the bottoms BP with respect to the extension lines EL is reduced while being deformed so as to be folded using the bottoms BP as axes. Thus, the stiffness of the right side surface 302m is reduced. Also, since the two recessed ribs recessed ribs 310 are disposed so as to be parallel with each other, the deformation of one recessed rib 310 and the deformation of the other recessed rib 310 can be caused to interfere with each other so that the stiffness of the right side surface 302m is further reduced.

The recessed ribs 310 are disposed in high-stiffness portions of the shock absorber 300. Specifically, as shown in FIG. 10A, the recessed ribs 310 are disposed in portions where the distance between the parting line PL and a ridge line RL formed by the front surface 302f and right side surface 302m is small. For example, the lower recessed rib 310 is disposed such that the distance L2 between the lower recessed rib 310 and parting line PL is smaller than the largest distance L1 between the parting line PL and the ridge line RL. The upper recessed rib 310 is disposed such that the distance L3 between the upper recessed rib 310 and parting line PL is smaller than the largest distance L1. The reason is as follows: the blow ratio is reduced as the distance from the parting line PL is reduced, and the blow ratio is increased as the distance from the parting line PL is increased; therefore, a portion less distant from the parting line PL has greater thickness and higher stiffness than a portion more distant from the parting line PL. By disposing the recessed ribs 310 in high-stiffness portions as described above, stiffness against the load F can be reduced.

The values of the ratio of L2 to L1 and the ratio of L3 to L1 are, for example, values smaller than 0.95, preferably values smaller than 0.9, more preferably values smaller than 0.85. Specifically, the values of the ratios are each 0.95, 0.94, 0.93, 0.92, 0.91, 0.9, 0.89, 0.88, 0.87, 0.86, 0.85, 0.84, 0.83, 0.82, 0.81, 0.8, 0.7, 0.6, 0.5, 0.4, 0.3, 0.2, or 0.1, or may be between any adjacent two of the values presented, or may be less than 0.1.

The values of the ratios of the blow ratios of the portions having the recessed ribs 310 to the blow ratio of a portion corresponding to L1 (the highest blow ratio of the hollow molded-body) are, for example, values smaller than 0.95, preferably values smaller than 0.9, more preferably values smaller than 0.85. Specifically, the values of the ratios are each 0.95, 0.94, 0.93, 0.92, 0.91, 0.9, 0.89, 0.88, 0.87, 0.86, 0.85, 0.84, 0.83, 0.82, 0.81, 0.8, 0.7, 0.6, 0.5, 0.4, 0.3, 0.2, or 0.1, or may be between any adjacent two of the values presented, or may be values less than 0.1.

3.1 Modification of Third Embodiment

Figure 14A:
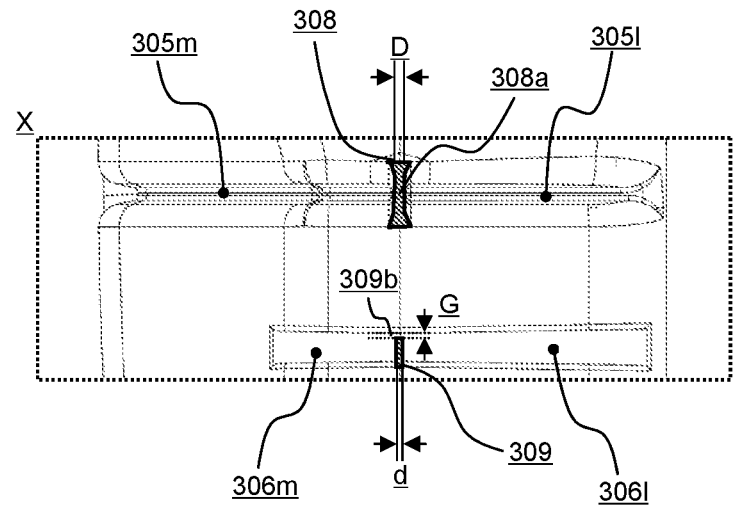
FIG. 14A is an enlarged view of a region X in a modification of the shock absorber 300 of the third embodiment of the present invention (see FIGS. 9A and 9B) and is a drawing showing a modification 1.
Figure 14B:
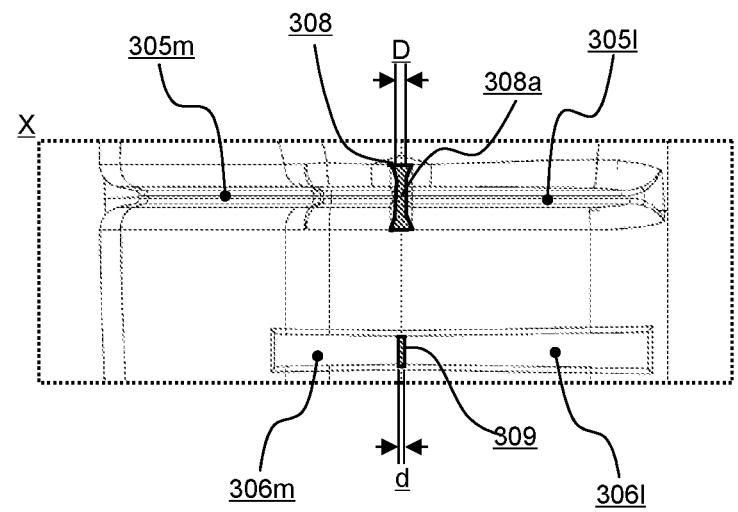
FIG. 14B is an enlarged view of a region X in a modification of the shock absorber 300 of the third embodiment of the present invention (see FIGS. 9A and 9B) and is a drawing showing a modification 2.
Figure 15:
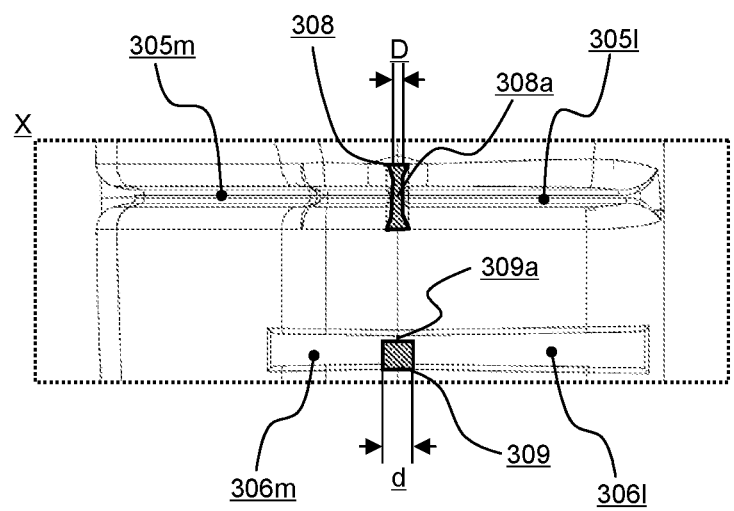
FIG. 15 is an enlarged view of a region X in a modification of the shock absorber 300 of the third embodiment of the present invention (see FIGS. 9A and 9B) and is a drawing showing a modification 3.

Next, various modifications of the shock absorber 300 of the third embodiment of the present invention will be described with reference to FIGS. 14A, 14B, and 15. FIGS. 14A, 14B, and 15 are enlarged views of regions X in modifications of the shock absorber 300 of the third embodiment of the present invention (see FIGS. 9A and 9B). FIGS. 14A, 14B, and 15 are drawings showing a modification 1, a modification 2, and a modification 3, respectively. The same elements as those in FIGS. 9A and 9B are given the same reference signs and will not be described.

Modification 1: Slit

The second weld 309 may be provided with a slit 309b having a width G rather than the thin portion 309a. The slit 309b can be formed, for example, by cutting a part of the second weld 309. The slit 309b has a thickness of 0. Accordingly, if the second weld 309 is provided the slit 309b, the thinnest portion of the second weld 309 has a thickness of 0. In the present modification, expansion of the slit 309b induces "V-shape" deformation of the shock absorber 300.

Modification 2: No Thin Portion

Instead of providing the thin portion 309a, the thickness of the second weld 309 may be made approximately uniform. In this case, the thickness d of the second weld 309 is the thickness of the thinnest portion of the second weld 309. In the present modification, fracture of the second weld 309 induces "V-shape" deformation of the shock absorber 300.

Modification 3: D<d

In the present modification, the thickness d of the portion other than the thin portion 309a, of the second weld 309 is greater than the thickness D of the thinnest portion (central portion 308a) of the first weld 308. On the other hand, the thickness d1 (not shown) of the thinnest portion (thin portion 309a) of the second weld 309 is smaller than the thickness D of the thinnest portion (central portion 308a) of the first weld 308. Thus, in the present modification, fracture of the thin portion 309a induces the "V-shape" deformation of the shock absorber 300.

While the shock absorber 300 of the third embodiment of the present invention has been described, the present invention is not limited thereto. For example, the first groove rib 305, second groove rib 306, and third groove rib 307 may be disposed in the front surface 302f. Or, the first groove rib 305 may be disposed in the rear surface 302r or front surface 302f, and the second groove rib 306 may be disposed in the upper surface 302u or bottom surface 302b. Or, the first groove rib 305 may be disposed in the upper surface 302u or bottom surface 302b, and the second groove rib 306 may be disposed in the rear surface 302r or front surface 302f. Also, the shapes, sizes, numbers, or the like of the first groove rib 305, second groove rib 306, third groove rib 307, right round rib 304m, left round rib 304l, diagonal groove ribs 311, and crescentic rib 312 may be any shapes or the like and may be designed as appropriate. Also, the number of recessed ribs 310 may be 1, 3, 4, 5, 6, 7, 8, 9, 10, or more. While the front surface 302f and rear surface 302r, the right side surface 302m and left side surface 302l, and the upper surface 302u and bottom surface 302b are configured to be opposed to each other, each set of opposed surfaces need not be parallel with each other. For example, each set of opposed surfaces may be approximately parallel with each other.

Also, in addition to these surfaces, inclined surfaces for connecting the surfaces may be provided.

"The shock absorber comprising a hollow molded-body having a hollow wherein the hollow molded-body has the load input surface to which a load is inputted, the opposite surface that is spaced from and opposed to the load input surface, and the connection surface that connects the load input surface and the opposite surface; the connection surface is provided with the first and second opposite surface groove ribs formed by recessing the opposite surface toward the load input surface and the first and second load input surface groove ribs formed by recessing the load input surface toward the opposite surface; the first weld is formed by welding together the ends of the first opposite surface groove rib and the first load input surface groove rib, and the second weld is formed by welding together the ends of the second opposite surface groove rib and the second load input surface groove rib; and the thickness of the thinnest portion of the second weld is smaller than the thickness of the thinnest portion of the first weld" and "the shock absorber comprising a hollow molded-body having a hollow wherein the hollow molded-body has the load input surface to which a load is inputted, the opposite surface that is spaced from and opposed to the load input surface, and the connection surface that connects the load input surface and the opposite surface; the parting line is formed on the connection surface; the grooved, recessed rib is disposed so as to extend over the load input surface and the connection surface; the recessed rib is disposed such that an angle of 10 to 85° is formed between a bottom disposed along the extension direction of the recessed rib and the extension line of the load input surface at the junction of the bottom and load input surface on the end face passing through the bottom; and the recessed rib is configured so as not to reach the parting line disposed on the connection surface" are independent inventions. Even one of the shock absorbers produces unique effects.

While the embodiments of the present invention and the modifications thereof have been described, these are illustrative only and are not intended to limit the scope of the present invention. These novel embodiments can be carried out as other various embodiments. Various omission, replacement, or change can be made to the embodiments without departing from the scope and sprit of the invention. These embodiments and modifications are included in the scope and spirit of the invention, as well as are included in the scope of the invention and equivalents thereof described in Claims.

DESCRIPTION OF REFERENCE SIGNS

100: shock absorber
101: blow-molded body
101*f*: front wall
101*r*: rear wall
101*s*: side wall
102*f*: front recessed rib
102*r*: rear recessed rib
103: end
104*f*: front groove rib
104*fs*: side wall
104*r*: rear groove rib
104*rs*: side wall
105: side groove wall
105*a*: thin portion
108: hollow
200: shock absorber
201: blow molded-body
201*f*: front wall
201*s*: side wall
204*f*: front groove rib
204*fs*: side wall
204*r*: rear groove rib
204*rs*: side wall
205: side groove wall
205*a*: thin portion
300: shock absorber
302*b*: bottom surface
302*f*: front surface
302*l*: left side surface
302*m*: right side surface
302*r*: rear surface
302*u*: upper surface
304*l*: left round rib
304*m*: right round rib
305: first groove rib
305*l*: first left groove rib
305*m*: first right groove rib
306: second groove rib
306*l*: second left groove rib
306*m*: second right groove rib
307: third groove rib
307*l*: third left groove rib
307*m*: third right groove rib
308: first weld
308*a*: central portion
309: second weld
309*a*: thin portion
309*b*: slit
310: recessed rib
311: groove rib
312: crescentic rib
313: mounting unit
BP: bottom
EL: extension line
PL: parting line

The invention claimed is:
1. A shock absorber comprising:
a hollow molded-body having a hollow, wherein
the hollow molded-body comprises front and rear walls that are spaced from and opposed to each other and a side wall that connects the front and rear walls,
the side wall is provided with a front groove rib formed by recessing the front wall and a rear groove rib formed by recessing the rear wall,
a side groove wall is formed by welding together at least parts of end walls of the front groove rib and the rear groove rib, and
the shock absorber has a configuration where;
the front groove rib comprises first and second front groove ribs; the rear groove rib comprises first and second rear groove ribs; a first side groove wall is formed by welding together at least parts of end walls of the first front and rear groove ribs and a second side groove wall is formed by welding together at least parts of end walls of the second front and rear groove ribs; and a thickness of the thinnest portion of the second side groove wall is smaller than a thickness of the thinnest portion of the first side groove wall.
2. The shock absorber of claim 1, wherein the first and second side groove walls are disposed on an identical plane included in the side wall.

3. The shock absorber of claim 1, wherein depths of the first front groove rib and the first rear groove rib are greater than depths of the second front groove rib and the second rear groove rib.

4. The shock absorber of claim 1, wherein a ratio of a thickness of the thinnest portion of the first side groove wall to a thickness of the thinnest portion of the second side groove wall is 1.5 or more.

5. The shock absorber of claim 1, wherein the hollow molded-body is a blow molded-body having a parting line, and
   the first and second side groove walls are formed on the parting line.

6. The shock absorber of claim 1, wherein
   a rib is formed in the front wall or the rear wall, and
   the first front groove rib or the first rear groove rib communicates with the rib.

* * * * *